(12) United States Patent
Campbell et al.

(10) Patent No.: US 12,196,345 B1
(45) Date of Patent: Jan. 14, 2025

(54) HIGH TORQUE CONNECTION WITH ENHANCED BREAK IN PERFORMANCE

(71) Applicant: VALORA ENGINEERING LTD., Edmonton (CA)

(72) Inventors: Steven Lee Campbell, Leduc (CA); Ginette Marie Tremblay, Edmonton (CA)

(73) Assignee: VALORA ENGINEERING LTD., Edmonton (CA)

( * ) Notice: Subject to any disclaimer, the term of this patent is extended or adjusted under 35 U.S.C. 154(b) by 0 days.

(21) Appl. No.: 18/709,506

(22) PCT Filed: Nov. 11, 2022

(86) PCT No.: PCT/CA2022/051667
§ 371 (c)(1),
(2) Date: May 12, 2024

(87) PCT Pub. No.: WO2023/082010
PCT Pub. Date: May 19, 2023

Related U.S. Application Data

(60) Provisional application No. 63/264,001, filed on Nov. 12, 2021.

(51) Int. Cl.
*F16L 15/06* (2006.01)
*E21B 17/042* (2006.01)
(52) U.S. Cl.
CPC ............ *F16L 15/06* (2013.01); *E21B 17/042* (2013.01)
(58) Field of Classification Search
CPC .............................. F16L 15/06; E21B 17/042
See application file for complete search history.

(56) References Cited

U.S. PATENT DOCUMENTS

| 4,548,431 A | 10/1985 | Hall et al. |
| 5,492,375 A | 2/1996 | Smith |

(Continued)

FOREIGN PATENT DOCUMENTS

WO     2006092649 A1     9/2006

OTHER PUBLICATIONS

International Search Report and Written Opinion of the International Searching Authority for Application No. PCT/CA2022/051667 dated Feb. 8, 2023.

(Continued)

*Primary Examiner* — David Bochna
(74) *Attorney, Agent, or Firm* — Boulware & Valoir PLLC

(57) ABSTRACT

A tubular member having a first connector provided on a first end thereof, this first connector being adapted to receive a corresponding connector provided on another tubular member, forming a tubular connection comprising: a pin connector, a box connector, an outer diameter, an inner diameter, and a longitudinal axis. The pin connector threads or box connector threads feature a threadform having at least one load flank reduction zone such that when the pin connector is threadably engaged with the box connector, the resulting tubular connection radial bearing strength is desirably reduced. More specifically in the preferred embodiment, the at least one load flank reduction zone is preferably configured such that the tubular connection radial bearing strength is between 100% to 110% of the cross sectional connection strength when the box connector is threadably engaged with a pin connector. A method for forming connectors on a tubular member comprising threads which have at least one load flank reduction zone described herein is also provided.

24 Claims, 14 Drawing Sheets

(56) References Cited

U.S. PATENT DOCUMENTS

| | | | |
|---|---|---|---|
| 5,908,212 | A | 6/1999 | Smith et al. |
| 6,412,831 | B1 | 7/2002 | Noel et al. |
| 6,447,025 | B1 | 9/2002 | Smith |
| 6,848,724 | B2 | 2/2005 | Kessler |
| 7,210,710 | B2 | 5/2007 | Williamson et al. |
| 9,816,646 | B2 | 11/2017 | Carrois et al. |
| 10,041,307 | B2 | 8/2018 | Muradov et al. |
| 2012/0286507 | A1 | 11/2012 | Maillon et al. |
| 2013/0147191 | A1 | 6/2013 | Mazzaferro et al. |
| 2018/0320456 | A1 | 11/2018 | Muradov et al. |

OTHER PUBLICATIONS

International Preliminary Examination Report on Patentability for Application No. PCT/CA2022/051667 dated Nov. 16, 2023.

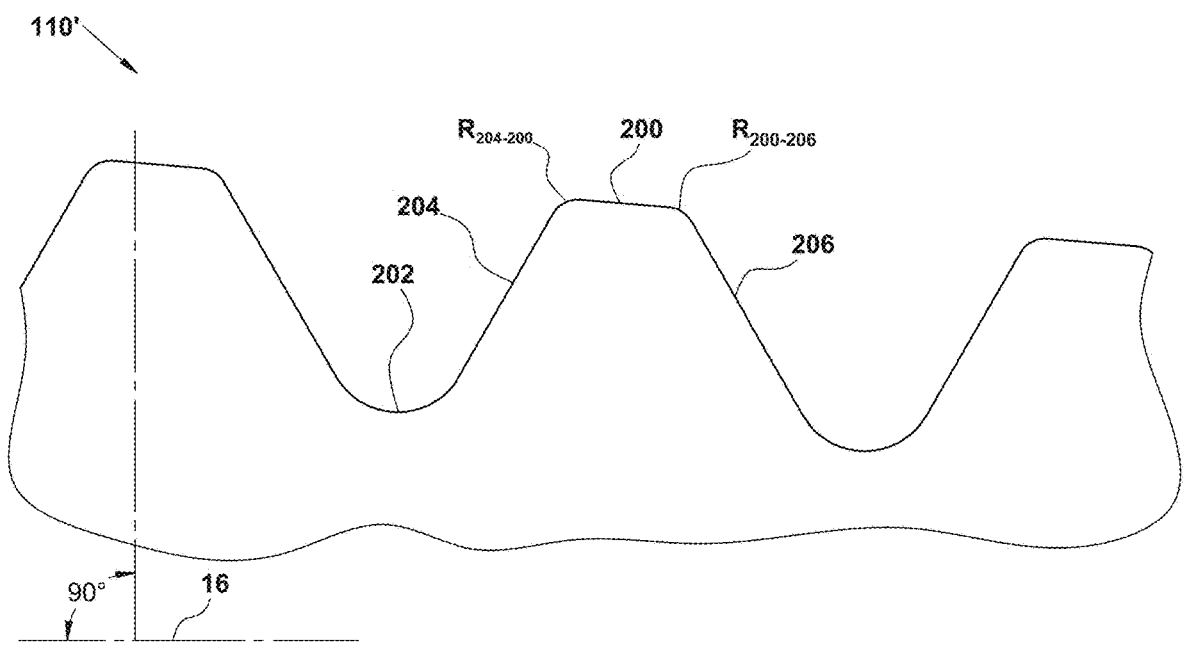
FIG. 9 - (PRIOR ART)
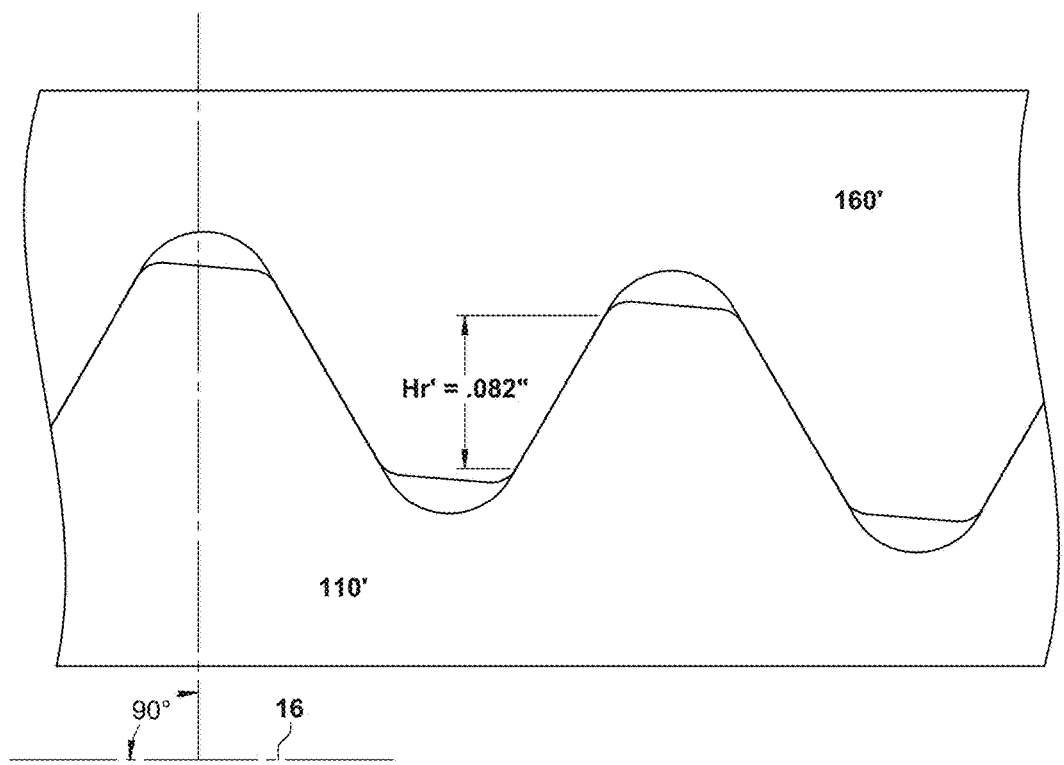
FIG. 10 - (PRIOR ART)

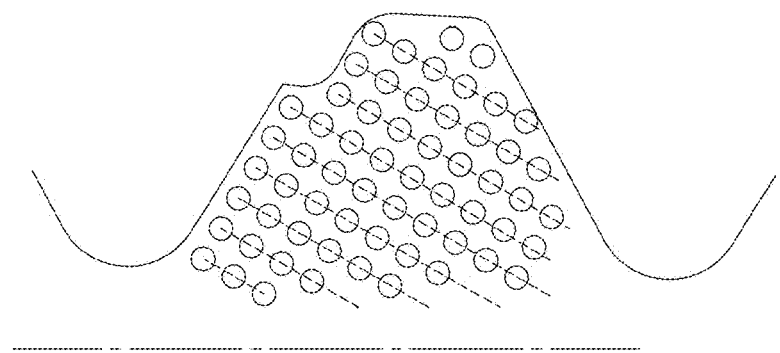
13a
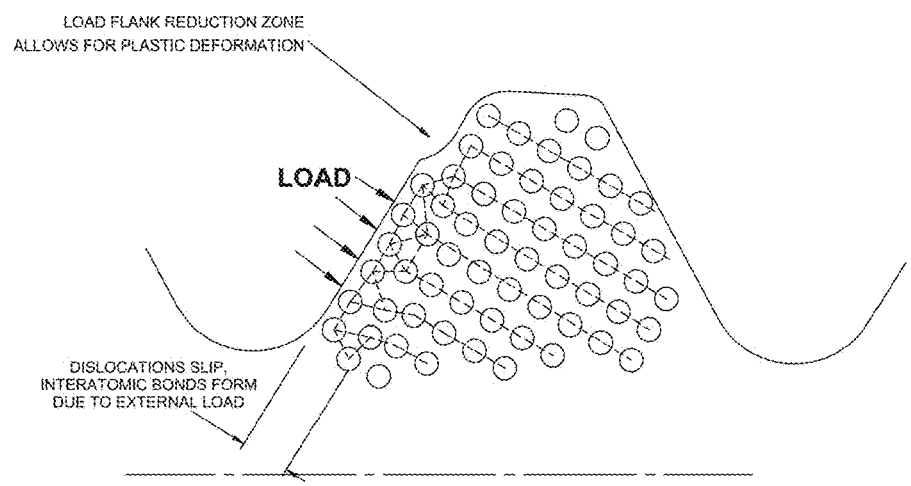
13b
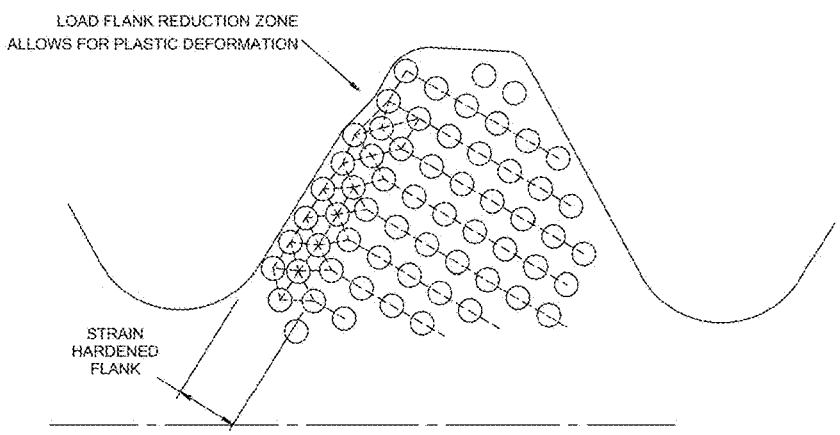
13c
FIG. 13

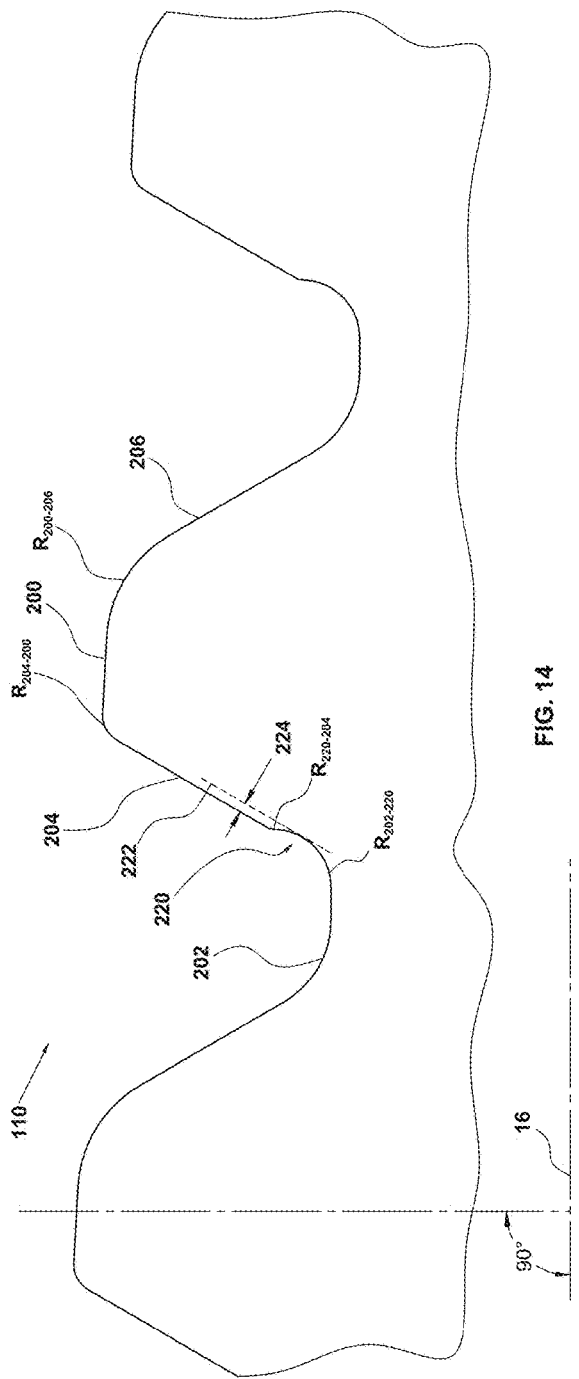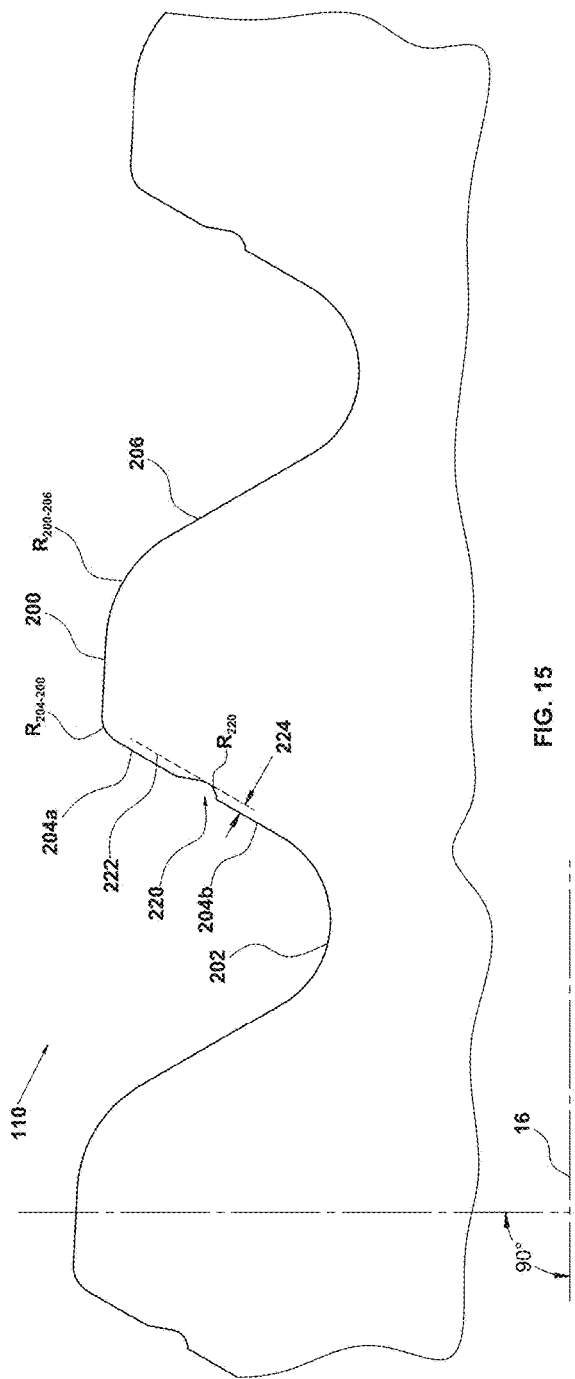

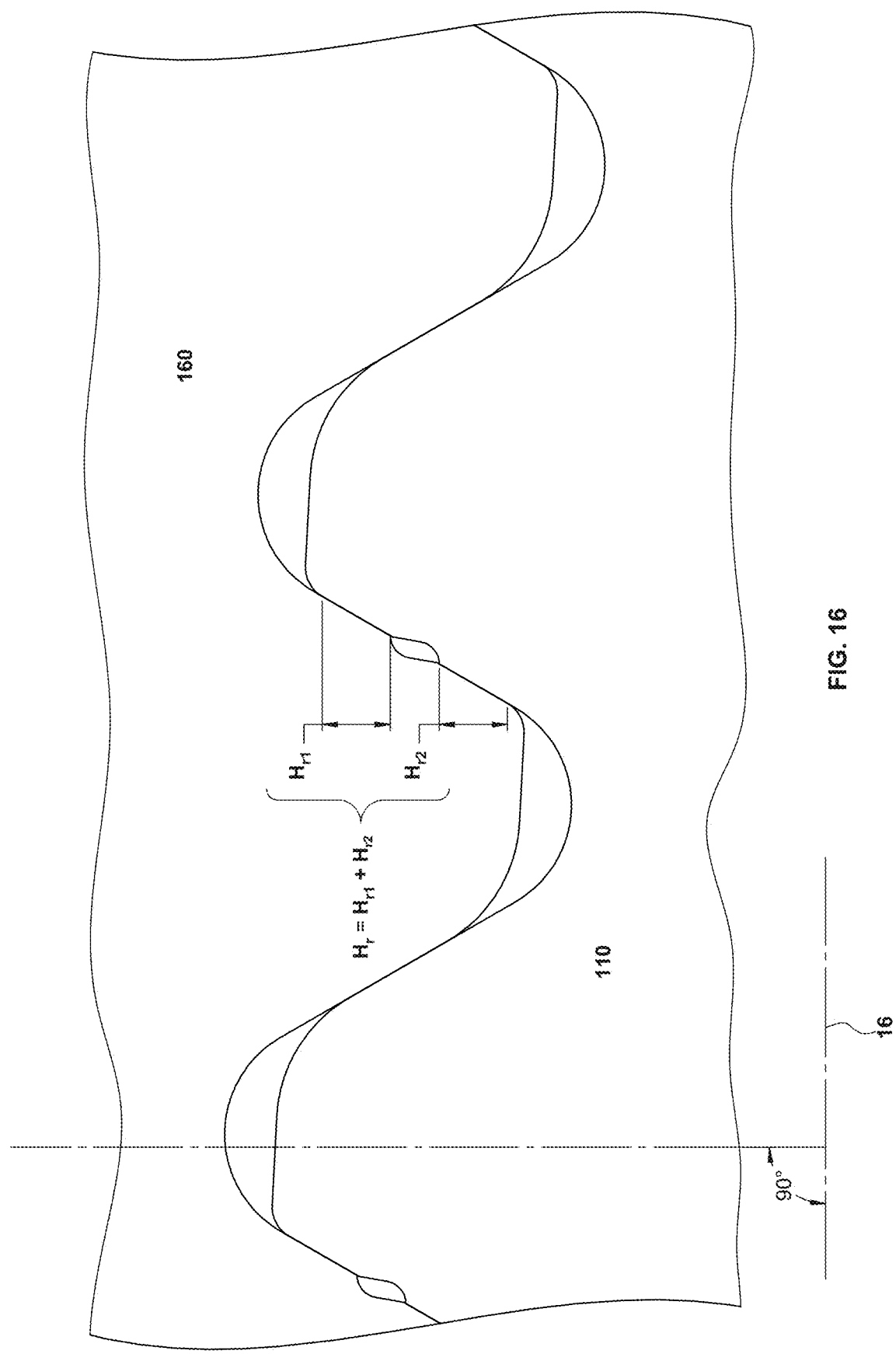

HIGH TORQUE CONNECTION WITH ENHANCED BREAK IN PERFORMANCE

CROSS REFERENCE TO PRIOR APPLICATIONS

PCT/CA2022/051667, filed on Nov. 11, 2022, which claims priority under the Paris Convention to U.S. Application No. 63/264,001, filed on Nov. 12, 2021. The entire contents of such prior applications are incorporated herein by reference as if set forth herein.

FIELD OF THE DISCLOSURE

The present application relates generally to tubular members having threaded connections. More specifically this application relates to tubular members having high strength double shoulder threaded connections utilized in downhole drilling operations such as drill pipe, drill collars, tool joints and downhole tools.

BACKGROUND

This section provides background information to facilitate a better understanding of the various aspects of the invention. It should be understood that the statements in this section of this document are to be read in this light, and not as admissions of prior art.

In oil and gas drilling a drill bit is threadably attached to the end of a drill string comprised of a variety of subassemblies and tubular members. The drill bit is traditionally attached to the Bottom Hole Assembly (BHA) at the bottom of the drill string which may include a variety of downhole tools and tubulars such as a rotary steerable tool, a mud motor, Measurement-While-Drilling (MWD) tools, Logging-While-Drilling (LWD) tools, a configuration of stabilizers, reamers, jars, shocks, agitators, and multiple drill collars among other modern drilling technologies. Connected to the BHA is a configuration of other tubular members typically including a plurality of Heavy Weight Drill Pipe (HWDP) and drill pipe which couple the drill bit and BHA back to the surface completing the drill string and affording for surface rotation, torque, compression, and tension to be applied to the drill string and thus the drill bit in efforts to further advance the borehole. Further, the assembled drill string also functions as a conduit for pumping drilling fluid through the sufficiently hollow inside diameter to clean the borehole, provide hydraulic power to downhole tools and cool the heat generated by the drill bit and downhole friction. It is common that all of these drill string tubular members are threadably attached to one another by tubular connections such that as the borehole is advanced further the drill string can be sequentially assembled or disassembled through the threading or unthreading of tubular members at surface. The most common tubular connections for use in a drill string are rotary shouldered connections, with most modern variants introducing a secondary torque bearing shoulder on the nose of the pin connector which contacts the rear of the box connector when the pin connector is threadably engaged with the box connector.

During drilling operations, it is desirable that all of the aforementioned tubular connections between adjacent drill string tubular members possess sufficient mechanical and metallurgical capabilities to withstand the loads placed on them during drilling operations (e.g., torsional, tensile, compressive loads, and so forth). Generally, the mechanical behavior of standard materials utilized in constructing tubular connectors (for example steel, aluminum, titanium) reflects the relationship between the material's deformation response to externally applied loads and forces. It will be appreciated that the stress-strain behavior of materials, in particular the metals used in constructing tubular members, are a large influence on the performance of a tubular connection. Further, as it will be appreciated by those skilled in the art it is desirable to exploit stress-strain characteristics of both the macro and microscopic behavior of a material's deformation mechanisms to strengthen and improve designs, including tubular connections. In this way, the mechanical behavior of the tubular connection under high loads may be enhanced to become desirably stronger and more predictable, while mitigating undesirable deformation, damage and fracture.

Without being limited to this or any other technique or theory, as it will be appreciated the mechanical behavior of a given material may be ascertained by a stress-strain test. In this way, stress may be defined through the relationship of a load applied perpendicular to a known test specimen cross section, and strain may be defined as the ratio of the change in length of said test specimen with reference to the original length of the specimen. Broadly speaking elastic deformation is a nonpermanent deformation where when an applied load is removed the loaded specimen returns to its original size and shape, and plastic deformation is a permanent deformation where when an applied load is removed the loaded specimen does not return to its original size and shape. More specifically, macroscopic elastic deformation is an indication of small changes in interatomic spacing and the stretching of interatomic bonds, while plastic deformation indicates the breaking of interatomic bonds and the forming of new interatomic bonds where large numbers of atoms or molecules permanently move relative to one another.

Further, it is known in the art that crystalline materials such as metals do not possess perfect order on an atomic scale, but instead contain large numbers of various imperfections and deviations from crystalline perfection. Particularly, many of the metallurgical and mechanical properties of materials are profoundly sensitive to deviations from the perfectly ordered crystalline structure. The influence of these defects is not always adverse, and often specific mechanical characteristics are tailored and fashioned by the deliberate introduction of controlled amounts of desirable imperfections. More particularly as discussed above, plastic deformation is a permanent change to a material, and on a microscopic scale corresponds to the net movement of large numbers of atoms in response to applied stress. During this process, interatomic bonds must be ruptured and then reformed around a dislocation; a linear defect around which some of the atoms are misaligned. Macroscopically, plastic deformation corresponds to the motion of large numbers of dislocations and the overall capability of a metal to plastically deform depends on the ability of dislocations to move.

One important source of these new dislocations is existing dislocations which multiply under load, a property known as dislocation density. More specifically, grain boundaries as well as internal defects and surface irregularities such as scratches and nicks may serve as dislocation formation sites where the more unconstrained the dislocation motion, the greater is the facility with which a metal may deform, and the weaker it behaves. Conversely, as strength is related to the ease with which plastic deformation can be made to occur, by deliberately inducing plastic deformation by means of applied compressive force, one constrains and reduces the mobility of dislocations, and in this way the mechanical strength of the material may be enhanced. Put more simply, greater mechanical forces will be required to initiate further plastic deformation, thus the material performance is increased. Generally, this is known in the art as strain hardening, work hardening, or cold working whereby a metal becomes stronger as it is plastically deformed.

It will be appreciated that for the materials discussed herein the elastic behavior of a material manifests as a generally proportional relationship between stress and strain, this linear relationship known as Hooke's Law corresponds to the material property known as Young's Modulus. Due to the permanent changes in geometry, and by extension permanent changes to the mechanical performance of a material, it is desirable to ascertain the stress level at which plastic deformation begins. As it is known in the art this property is known as the yield strength of the material, shown as σy in FIG. 1 and the overall magnitude of the yield strength for a metal is an indicator of its resistance to plastic deformation. More specifically, without being limited to this theory or any other, it will be appreciated in studying the example engineering stress strain curve in FIG. 1 that a convention has been established wherein a straight line is constructed parallel to the linear elastic portion of the engineering stress-strain curve at some specified strain offset, usually 0.002 (0.2%), wherein the stress corresponding to the intersection of this straight line and the engineering stress-strain curve is commonly defined as the yield strength of the material. It will be understood that this intersection occurs after a small amount of non-linearity occurs within the graph, indicating a very small degree of plastic deformation has occurred. The slope of this line corresponds to Young's Modulus whose magnitude is a measure of the resistance to separation of interatomic bonding forces, indicated as E in FIG. 1.

It will be appreciated that should a load be applied to a material to induce stress levels exceeding the yield strength, combined elastic and plastic deformations will occur simultaneously. Upon releasing the applied load, a fraction of the total deformation will be recovered as elastic strain, with the remainder of the deformation being permanent plastic deformation. As shown in FIG. 2, during the unloading cycle the stress-strain curve follows a near straight-line path from the point of unloading, with the slope of the unloading curve being parallel to the initial elastic portion of the curve, and thus virtually identical to Young's Modulus. The magnitude of this elastic strain which is regained during unloading corresponds to strain recovery. If the load is reapplied, the curve will traverse the same linear portion in the direction opposite to the unloading, thus the material, and by extension the mechanical performance of a design, can behave in an elastic fashion despite having a degree of plastic strain induced previously. It will be understood that under this condition a new effective yield strength exists for a material that has residual plastic strain as illustrated in FIG. 2. In this way, it becomes possible to desirably induce plastic strain into a material to enhance the mechanical performance and strength of a design.

A known practice of utilizing strain hardening to enhance a tubular connector is through the cold rolling of threads, however this technique does not impart stress on thread flanks. Instead, cold rolling creates residual compressive stress in the thread root in efforts to reduce fatigue cracking of the connector. Shot peening may also be performed on pin and box connectors to impart cold work onto thread flanks and seal surfaces, however this is typically reserved for materials which are not desirably coated with anti-friction coatings (for example non-magnetic steel) as shot peening generally increases costs per-connector without providing a high degree of strain hardening as the size of the shot peening bead, and thus overall intensity of the peening, are limited to the smallest features of the thread form such as the thread root radius.

A common form of damage to thread form flanks is observed as a 'tearing' or 'cold welding' of the thread flank material during threading or unthreading of the tubular connection. This type of damage is known in the art as "galling" and, without being limited to this or any other theory, is understood to be the result of high static or dynamic contact stresses between predominantly tensile stress state materials. A common example would be two newly manufactured box and pin connectors being threadably made up and torqued together. The freshly machined surface of the thread form load flanks may be in a predominantly tensile stress state due to the shearing nature of the cutting tools used in manufacturing the connector thread, and thus the high stress state of the contacting load flanks of the connection may induce galling between these surfaces, resulting in damage requiring repair or replacement.

In efforts to prevent this damage, several technologies and methods have been developed and employed. The most common technology is the surface coating of pin and box connector threads which can take many forms including phosphate, copper, or spray coatings among others and are moderately effective at providing an additional resistance to galling and are generally highly desirable. However, coatings do not offer any strain hardening thus do not alter the stress state of thread flanks. Instead, most coatings serve only to reduce friction within the threads for a time as they are known to wear off through multiple makeup and break out cycles of the tubular connection. Thus, it will be appreciated that it would be desirable to impart strain hardening to thread flanks as this would be a permanent preventative measure against damage.

Therefore, in efforts to strain harden thread flanks, one technique is the practice of "Make and Break" where newly manufactured or repaired tubular connectors are subjected to multiple makeup torque cycles prior to being put into operation. As a single makeup cycle is known in the art to induce little if any cold work on the load flanks of a connector, it is typical that 3 to 5 cycles are performed with the goal of creating a desirable stress state within the thread load flanks where thread flank damage may be mitigated or eliminated entirely.

Make and Break is convenient for threaded connectors on newly manufactured drill pipe as typically the tool joints are not yet welded to the tube body and are thus easily handled and threadably connected. However, in the case of repaired or remanufactured tubular members it is often not feasible to perform Make and Break operations in a controlled environment as most manufacturing facilities do not have the required equipment nor the handling capability to threadably connect and torque full length tubular members. This necessitates engaging costly third-party services to have Make and Break performed, for example Make and Break service can often increase the price of manufacturing or repairing a single rotary shouldered connector by as much as 100% or more. Alternatively, Make and Break may be performed on a drilling rig during drilling operations while assembling the drill string. This is highly undesirable as it consumes drilling rig time which can be orders of magnitude more expensive than shop time, and further delays drilling operations as each new connector is made up and broken apart multiple times.

Due to the time and costs associated with the practice, Make and Break is therefore often not performed at all for newly manufactured connectors, even in cases where high quantities of tubular members have been machined, for example a drill string tubular connection conversion. In this way, each new connector in the drill string is highly susceptible to damage when put into operation.

Additionally, the makeup torque of a tubular connection is known in the art to be calculated predominately utilizing cross sectional area properties of the connection. These cross sectional properties, and thus the calculated makeup torque, are greatly influenced by the outside and inside diameters of the tubular connectors comprising the tubular connection and can vary greatly even for a fixed thread geometry. For example, a DS40 connection having an outside diameter of 5.250 inches and an inside diameter of 2.688 inches would have a lower makeup torque than a DS40 connection having an outside diameter of 5.250 inches and an inside diameter of 2.437 inches due to the difference in cross sectional strength, however the radial bearing strength of the tubular connection calculated based on thread flank properties would remain identical. In this way the amount of force, and by extension strain hardening, imparted on the thread load flanks during Make and Break may not be consistent for a given tubular connection where cross sectional properties are utilized to compute the makeup torque.

Further, for the majority of tubular connections the ratio of radial bearing strength to cross sectional strength is disproportionately high, even climbing higher than 2.0 in some cases, indicating that even for a fixed outside diameter and inside diameter the forces applied to the thread load flanks during Make and Break are governed by the cross sectional properties of the connection. In this way, the forces on the thread load flanks during tubular connection makeup may be too low to induce any appreciable cold work thus strain hardening of thread load flanks may not occur at all.

Historically the goals in developing a new tubular connection design was to maximize the calculated torque carrying capability of a given connection outside diameter and inside diameter. For example, U.S. Pat. Nos. 5,908,212, 7,210,710, and 9,816,646 disclose various tubular connection designs which aim to increase the torsional capability and handling characteristics of tubular connections, however these inventions do not reveal any methods for inducing desirable compressive stress in the thread load flanks.

As disclosed in U.S. Pat. No. 5,492,375 it is preferred to have the pin nose or box counterbore of the tubular connector yield prior to the thread shearing and teaches a method by which the length of a connection thread zone may be established. However, patent '375 does not make any assertion of the behavior of thread load flank bearing stresses and correlates the length of the tubular connection thread with the various cross sectional areas with the goal of achieving an optimal configuration where the threads are close to, but do not exceed their shear strength under high torque loads. In this way, any alteration to the outside diameter and inside diameter of a tubular connection design necessitates a thread length revision which produces the undesirable side effect that the revised connection may no longer remain compatible with all prior variants. Additionally, should the case of increased thread length be required under patent '375's teachings to ensure thread shear is of little concern, the tubular connection's radial bearing strength may increase due to increased flank area. This action would result in proportionally reducing force, and by extension strain hardening, imparted on the thread load flanks during Make and Break or usage of the connection.

A balanced thread form is disclosed in U.S. Ser. No. 10/041,307 which reveals thread forms that aim to optimize the radial load flank bearing strength with the thread form shear strength, however downhole failure of modern tubular connections due to thread shear is uncommon particularly with double shouldered connections. High load cases downhole are typically caused by high torsional loads which result in cross sectional yield failures such as swelling of the primary and/or secondary shoulders, or the stretching of pin and/or box connectors. Further in the case of purely tensile drill string loads, much like a simple threaded fastener, the makeup torque of a rotary shouldered connection preloads the primary shoulder with compressive force which must be overcome to apply direct shear loads on the thread form. In many cases the drill string itself, in particular drill pipe tube bodies, possess less tensile force capacity than could be applied to the tubular connection to separate the primary shoulder let alone cause catastrophic shearing of the entire plurality of threads. Further, the radial load flank bearing strength loads and stresses are not correlated to the cross sectional area stresses nor by extension the makeup or drilling torque in the design of the thread form. In this way, the present invention could be effectively applied to the style of connection disclosed in '307 to further enhance its performance while maintaining compatibility.

BRIEF SUMMARY

There is provided a tubular member having a first end having a first threaded connector and a second end having a second threaded connector, the first and second connectors being configured to form a tubular connection with adjacent tubular members. In the preferred embodiment the tubular connection is formed from the first connector being a box connector and the second connector being a pin connection, though it will be understood that other configurations of threaded connectors are possible without deviating from the scope of the invention described herein. Further, the tubular connection between tubular members includes an outer diameter, an inner throughbore diameter, a nominal pitch diameter, and a longitudinal axis. In an embodiment, the tapered pin connector includes a primary shoulder and a secondary shoulder configured to engage the tapered box connector primary shoulder and secondary shoulder. In addition, between the primary and secondary shoulders, the pin and box connectors include a zone of external and internal threads respectively. The threaded zones comprise a plurality of threads which taper relative to the longitudinal axis. Further, the plurality of threads includes a thread crest, a thread root, at least one load flank extending along a line from the thread root to the crest, a stabbing flank extending along a line from the thread root to the crest, and at least one load flank reduction zone. The load flank of the pin connector is more proximate the primary shoulder, whereas the box load flank is more proximate the secondary shoulder. The stabbing flank of the pin connector is more proximate the secondary shoulder, whereas the box stabbing flank is more proximate the primary shoulder. When the pin connector is threadably engaged with the box connector each of the at least one load flanks on the pin connector contacts the at least one load flanks of the corresponding thread on the box connector along a projected radial direction such that at least one projected load flank radial contact face $H_r$ measured in inches is formed by the mating load flanks. Along the length of the zone of threads, this load flank radial contact face corresponds to a radial bearing strength $S_{rb}$ for the plurality of threads representing the amount of force required to induce plastic deformation into the load flanks, this deformation resulting in a layer of permanent compressive stress material within the thread on load flanks. The connection has a cross sectional connection strength $S_{cs}$ based on the geometry of the primary shoulders, secondary shoulders, nominal pitch diameter, and plurality of threads representing the amount of force required to induce plastic deformation (or "yielding") in the weakest cross sectional areas of the connection, resulting in permanent stretching, necking, belling, swelling, or compression of the connection cross sectional geometry. More specifically in one embodiment, the at least one load flank reduction zone is preferably configured such that the radial bearing strength is between 100% to 110% of the cross sectional connection strength. In this way, when the tubular connection is threadably made up and torqued to the desired magnitude, the load flank of the plurality of threads will experience approximately the same levels of stress as the tubular connection cross section, enhancing the load flanks with increased cold work and residual compressive stress thus greatly improving galling resistance, while also ensuring that the bearing strength is always equal to or stronger than the cross sectional connection strength thus preventing excessive plastic deformation to the threadform.

As known in the art, the torsional strength and makeup torque of the tubular connection are determined by the connection cross sectional strength, thus by ensuring the radial bearing strength is equal to, or marginally greater than the connection cross sectional connection strength, the plurality of threads are protected from failure due to be being overstressed. Further, should the at least one load flank reduction zone be configured appropriately as in the preferred embodiments discussed herein the shear strength of the tubular connection remains maximized thus eliminating concerns of catastrophic failure due to thread shear failure.

In a preferred embodiment the load flank reduction zone includes a limiting flank inset parallel from the load flank, a first radius extending between the thread crest and the limiting flank having a first radius of curvature, a second radius extending from the limiting flank to the load flank having a second radius of curvature. Further, the first radius has a first convex radius of curvature, and the second radius has a second concave radius of curvature. In this way, when the pin connector is threadably engaged with the box connector each of load flanks on the pin connector contacts the load flanks of the corresponding thread on the box connector along a projected radial direction such that at least one projected load flank radial contact face $H_r$ is formed by the mating load flanks and is equal to approximately 0.070 inches.

In an alternative embodiment the load flank reduction zone includes a limiting flank inset parallel from the load flank, a first radius extending between the thread root and the limiting flank having a first radius of curvature, a second radius extending from the limiting flank to the load flank having a second radius of curvature. Further, the first radius has a first convex radius of curvature, and the second radius has a second concave radius of curvature. In this way, when the pin connector is threadably engaged with the box connector each of load flanks on the pin connector contacts the load flanks of the corresponding thread on the box connector along a projected radial direction such that at least one projected load flank radial contact face $H_r$ is formed by the mating load flanks and is equal to approximately 0.070 inches.

There is also provided a method for forming a tubular connector on a tubular member for threadably connecting a tapered pin connector with a tapered box connector, the tubular connection having an outer diameter, an inner throughbore diameter, a nominal pitch diameter, and a longitudinal axis. In an embodiment, the method includes (a) forming a box connector on the end of a first tubular member, the box connector comprising an outside diameter, an inner throughbore diameter, a box primary shoulder, a box secondary shoulder, and a zone of internal threads having a nominal pitch diameter wherein when the box connector is threadably engaged with a pin connector the primary shoulders, secondary shoulders, nominal pitch diameters, and plurality of threads form a cross sectional connection strength $S_{cs}$. In addition, the method includes (b) forming a plurality of threads in the region between the box primary shoulder and the box secondary shoulder, the plurality of threads comprising a thread crest, thread root, a load flank, and a stabbing flank, wherein when the box connector is threadably engaged with a pin connector each of the plurality of threads on the box connector contacts a corresponding thread on the pin connector along a projected radial direction such that a projected load flank radial contact face $H_r'$ measured in inches is formed by the mating load flanks. Further, the method includes (c) forming at least one load flank reduction zone on the load flanks of the plurality of box connector threads wherein when the box connector is threadably engaged with a pin connector, the at least one load flank reduction zone reduces the projected load flank radial contact face $H_r'$ and forms at least one reduced projected load flank radial contact face $H_r$. More specifically in one embodiment, the at least one load flank reduction zone is preferably configured such that the radial bearing strength is between 100% to 110% of the cross sectional connection strength when the box connector is threadably engaged with a pin connector.

BRIEF DESCRIPTION OF THE DRAWINGS

These and other features will become more apparent from the following description in which references are made to the following drawings, in which numerical references denote like parts. The drawings are for the purpose of illustration only, are not necessarily to scale, and are not intended to in any way limit the scope of the invention to the particular embodiments shown. In the interest of clarity and brevity, certain aspects discussed herein may be illustrated in an exaggerated scale or in a simplified schematic form having some details of conventional elements omitted.

FIG. 9 is an enlarged cross section view of a portion of a prior art pin connector.

FIG. 10 is an enlarged cross section view of a portion of a prior art connector having been threadably engaged.

FIG. 13 is a sequence of images depicting an enlarged cross section view of a portion of a pin connector having a preferred embodiment of a load flank reduction zone before during and after an external load is applied, with exaggerated imagery of atomic interactions.

FIG. 14 is an enlarged cross section view of a portion of a pin connector having an alternative embodiment of a load flank reduction zone formed near the thread root.

FIG. 15 is an enlarged cross section view of a portion of a pin connector having an alternative embodiment of a load flank reduction zone groove.

FIG. 16 is an enlarged cross section view of a portion of a tubular connection formed by pin and box connectors both having an alternative embodiment of a load flank reduction zone.

DETAILED DESCRIPTION OF THE PREFERRED EMBODIMENTS

The units of measurement and methods of describing thread load flank interactions as used herein are not meant to limit the scope of the invention and should be interpreted in the broadest sense possible. The terms "pin connector" and "box connector" should be interpreted equivalent to "male connector" and "female connector", respectively, as these terms are known in the art. Thus, a pin or male connector comprises a zone at one end of a tubular member having a threaded external surface. Similarly, a box or female connection end comprises a zone at one end of a tubular member having a threaded internal surface.

Figure 1:
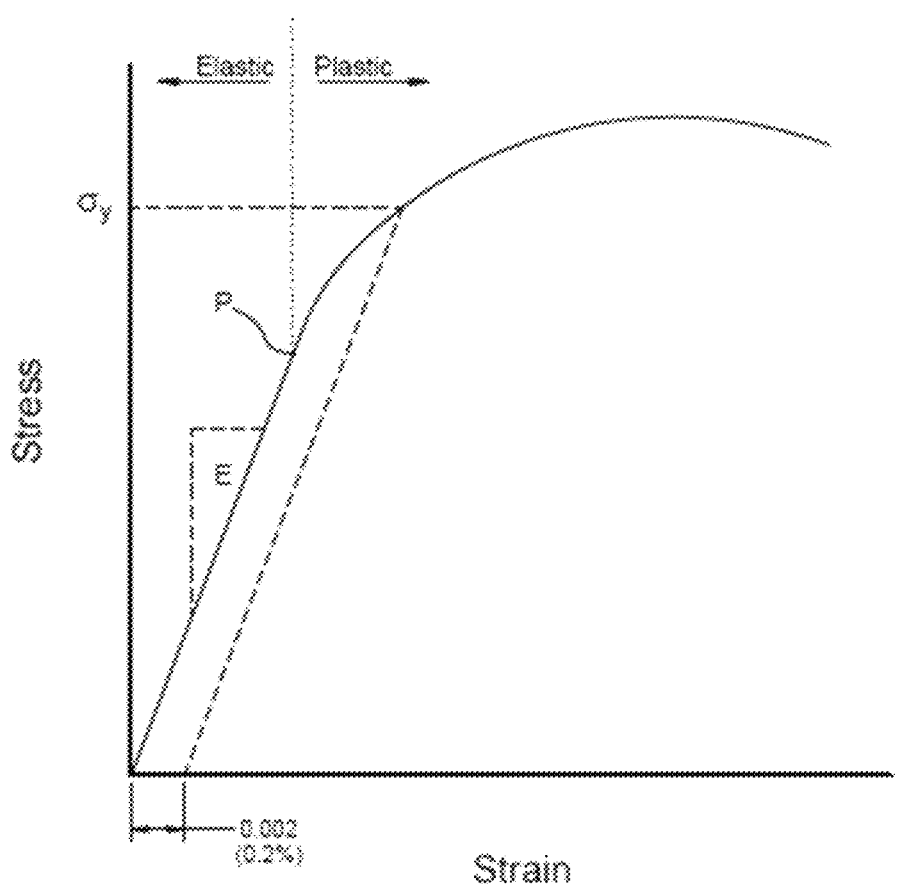
FIG. 1 is an example of an engineering stress-strain curve.
Figure 2:
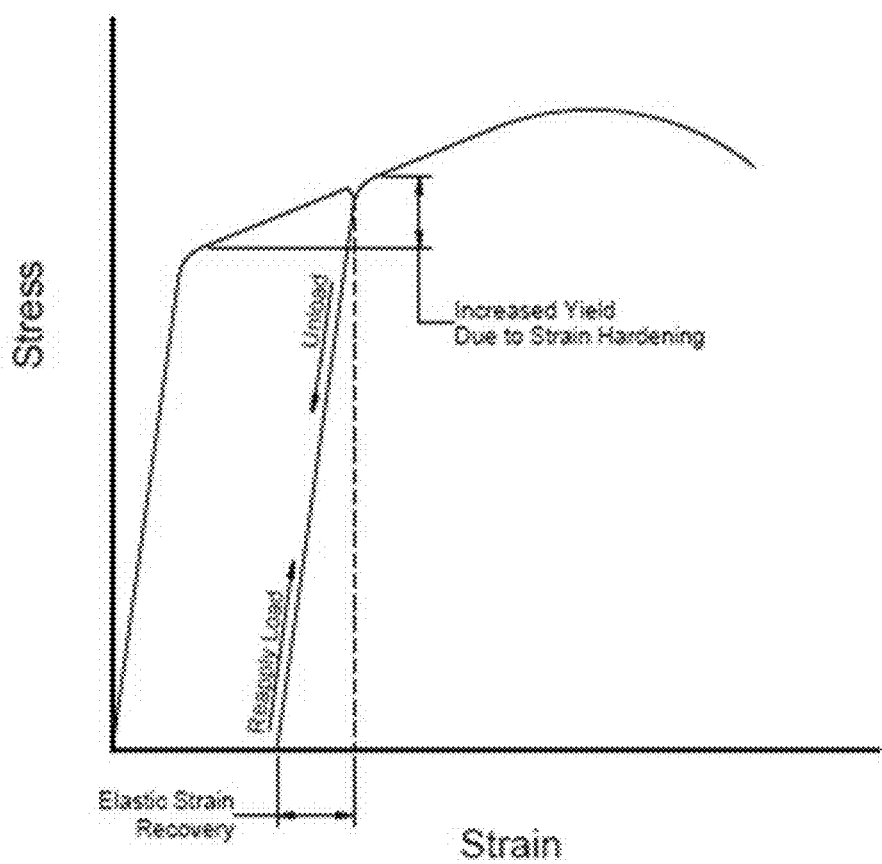
FIG. 2 is an example of an engineering stress-strain curve showing a loading and unloading curve.
Figure 3:
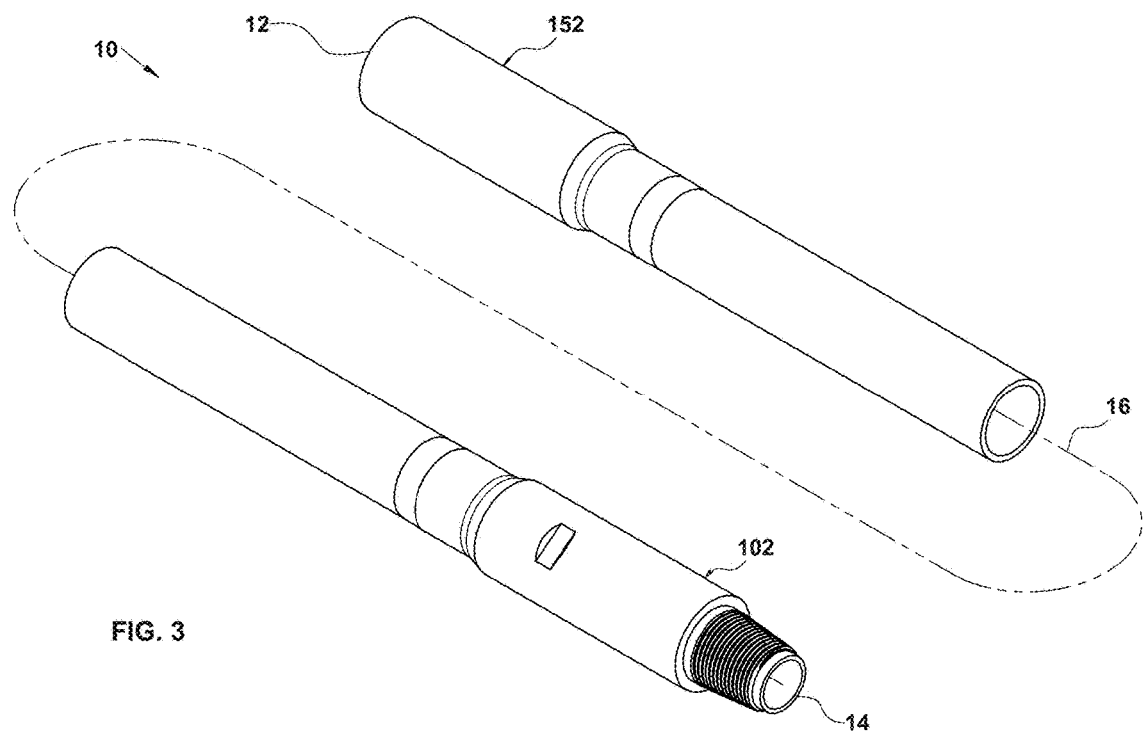
FIG. 3 is a perspective view of an embodiment of a tubular member having tubular connectors.
Figure 4:
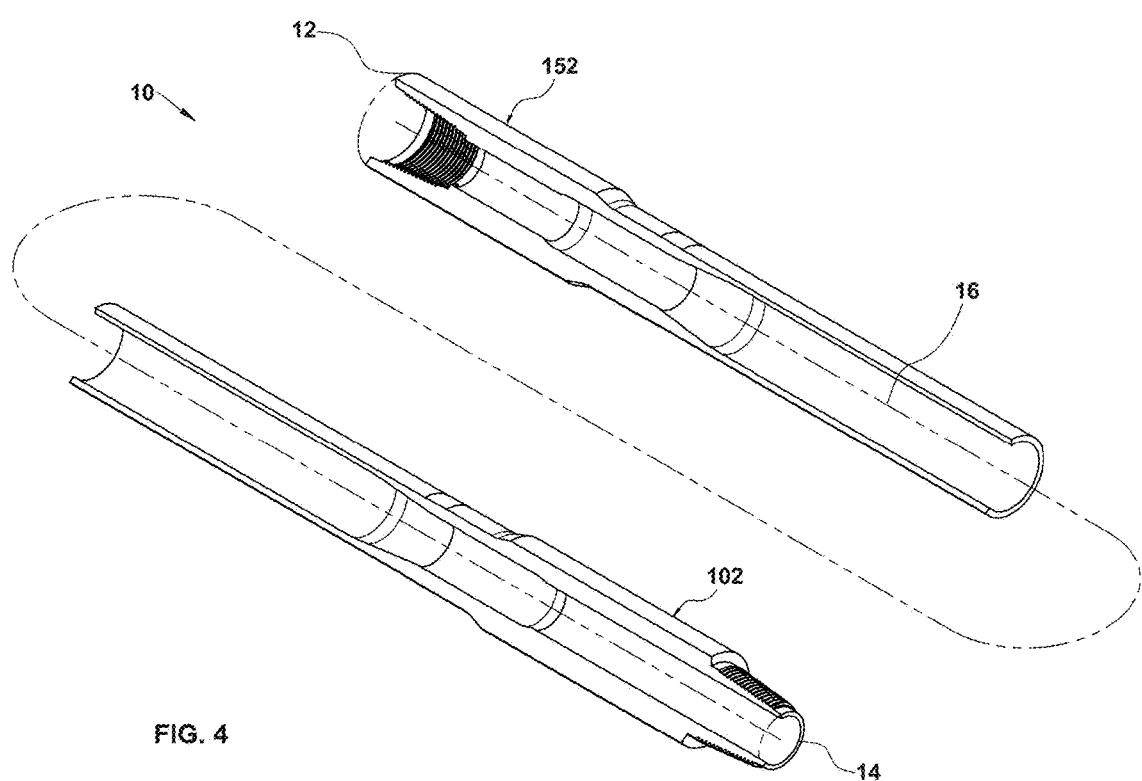
FIG. 4 is a perspective view in partial section of a tubular member having tubular connectors.

Referring to FIG. 3 and FIG. 4 a tubular member 10 is shown having a top end 12 and a bottom end 14 and a longitudinal axis 16. Threaded connectors are disposed at each end to permit the connection of the tubular member 10 to an additional axially adjacent tubular member. For example, as illustrated the tubular member 10 has a box connector 152 disposed at the top end 12 and a pin connector 102 disposed at the bottom end 14 such that further tubular members 10 may be threadably connected, forming the tubular connection 100 shown later in FIG. 8. This may be performed in succession to assemble a drill string; however, it should be appreciated that tubular member 10 may have any combination of box connector 152 or pin connector 102 at either or both of the top end 12 or bottom end 14 without deviating from the scope of the invention described herein. Further details of the tubular connection 100 and the pin connector 102 and the box connector 152 are presented below.

Figure 5:
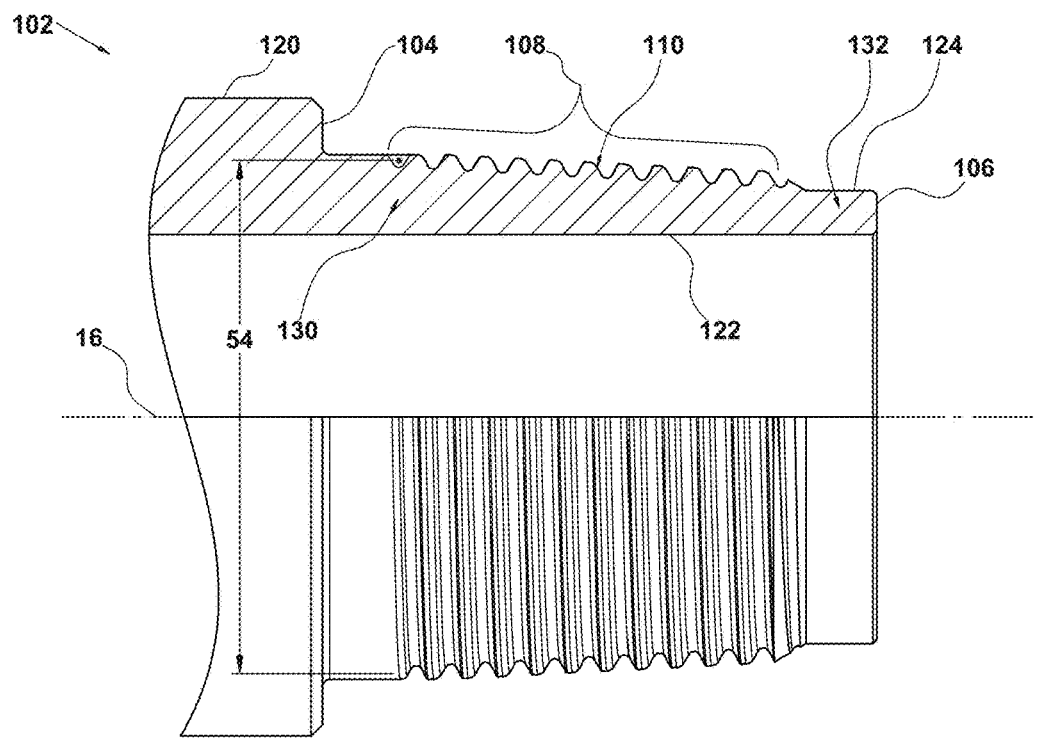
FIG. 5 is a side view in quarter section of a threaded pin connector.

Referring now to FIG. 5, a side view of pin connector 102 is shown in quarter section. The pin connector 102 has an outside diameter 120 and a throughbore inside diameter 122 and consists of a primary shoulder 104 and a secondary shoulder 106 with a zone of external threads 108 between the two shoulders wherein the zone of external threads consists of a plurality of fully formed threads 110. Further details of the fully formed threads 110 are presented below. The pin connector 102 has a cross sectional area 130 substantially determined by the pin connector thread 110 and nominal pitch diameter 54 and the inside diameter 122. Additionally, the pin connector 102 has a nose cross sectional area 132 formed by the pin nose outer diameter 124 and inside diameter 122.

Figure 6:
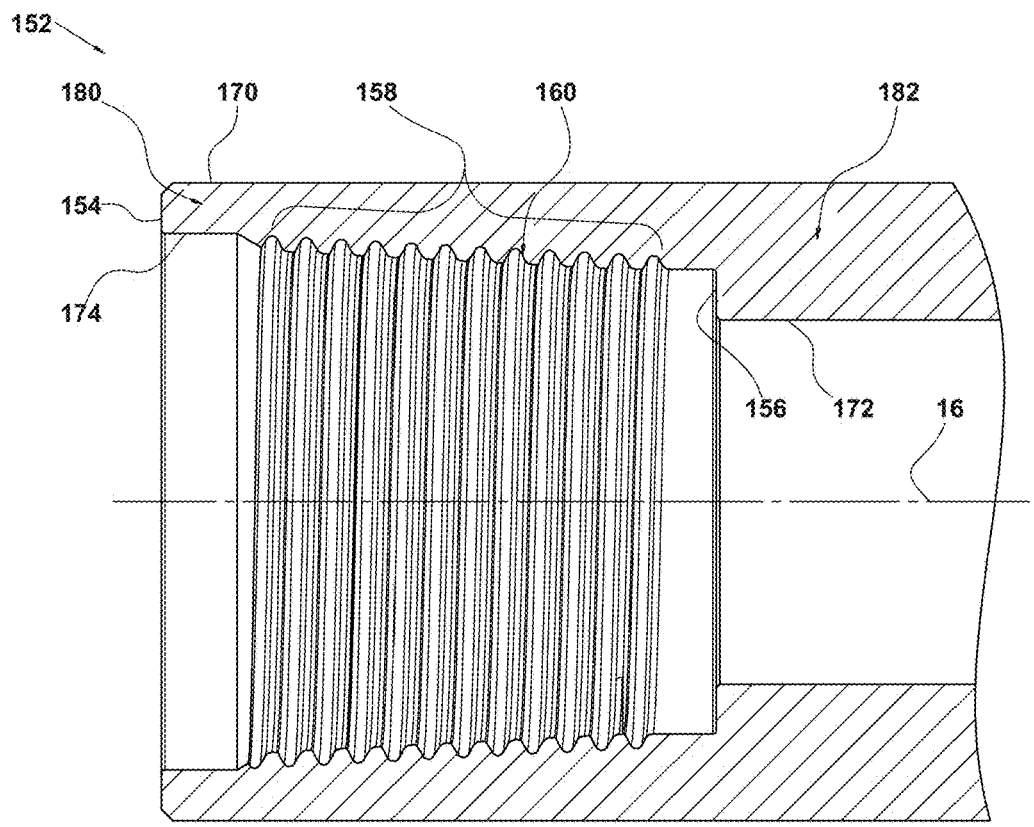
FIG. 6 is a side view in section of a threaded box connector.

Referring now to FIG. 6, a side view of box connector 152 is shown in full cross section. The box connector 152 has an outside diameter 170 and a throughbore inside diameter 172 and consists of a primary shoulder 154 and a secondary shoulder 156 with a zone of internal threads 158 between the two shoulders wherein the zone of internal threads consists of a plurality of fully formed threads 160. Further details of the fully formed threads 160 are presented below. The box connector 152 has a cross sectional counterbore area 180 formed by the outside diameter 170 and counterbore inner diameter 174. Additionally, the box connector 152 has a cross sectional area 182 formed by the outer diameter 170 and inside diameter 172.

Figure 7:
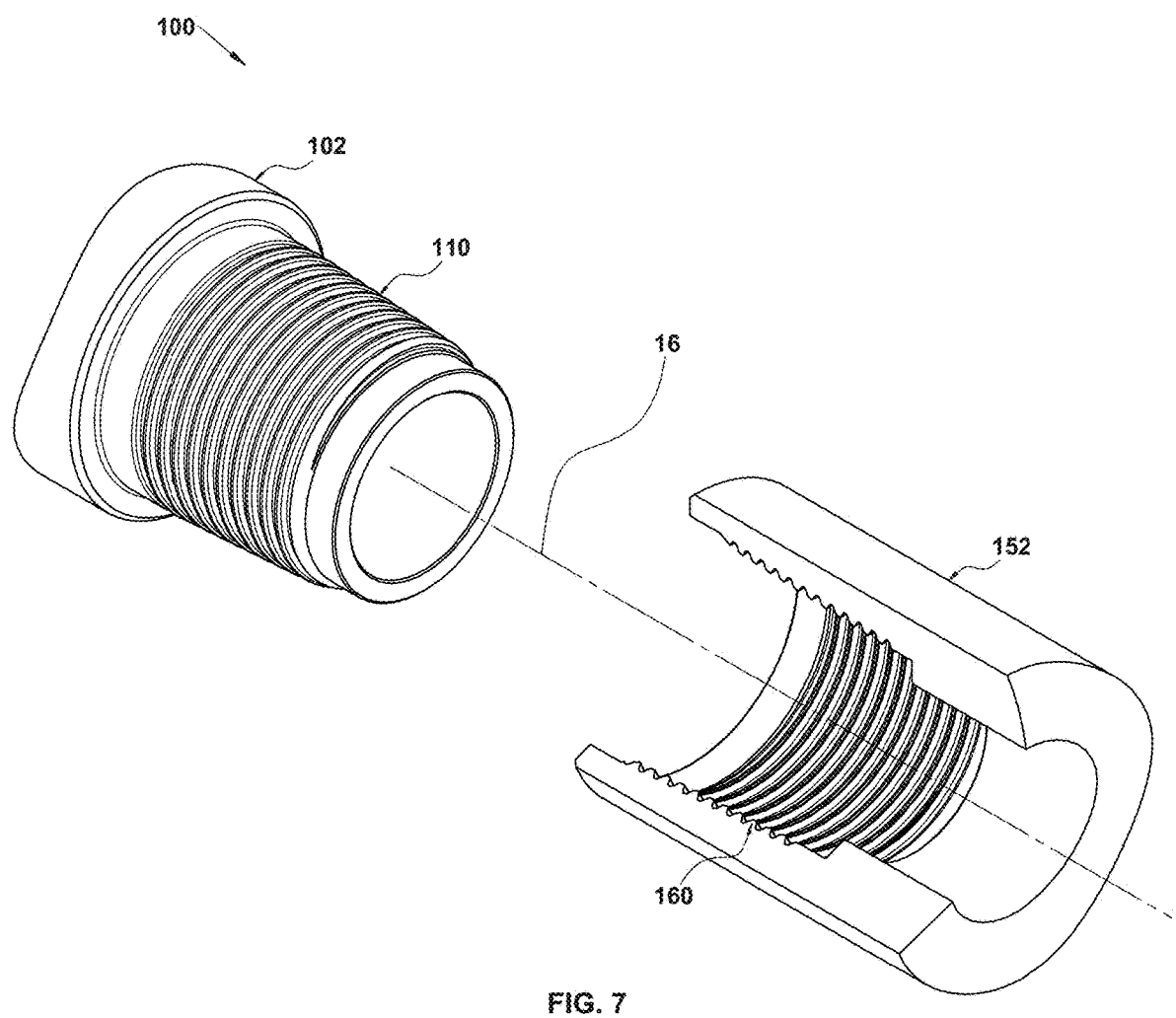
FIG. 7 is a perspective view in partial section of a tubular connection without being threadably engaged.

FIG. 7 shows the pin connector 102 and the box connector 152 in an isometric view aligned with each other on the longitudinal axis 16 prior to the connectors being threadably engaged to form a tubular connection 100. In the embodiment shown in FIG. 7 and FIG. 8 the pin connector outer and inner diameters 120 and 122 respectively, are substantially the same as the box connector outer and inner diameters 170 and 172 respectively; however, it will be appreciated by those skilled in the art that the connector outer diameters 120 and 170 may differ from one another without deviating from the principles disclosed herein. Likewise, the connection inside diameters 122 and 172 may differ from one another without deviating from the principles disclosed herein. Critically then, it is the fully formed pin threads 110 and fully formed box threads 160 which must remain compatible with one another to ensure the tubular connection 100 remains threadable.

Figure 8:
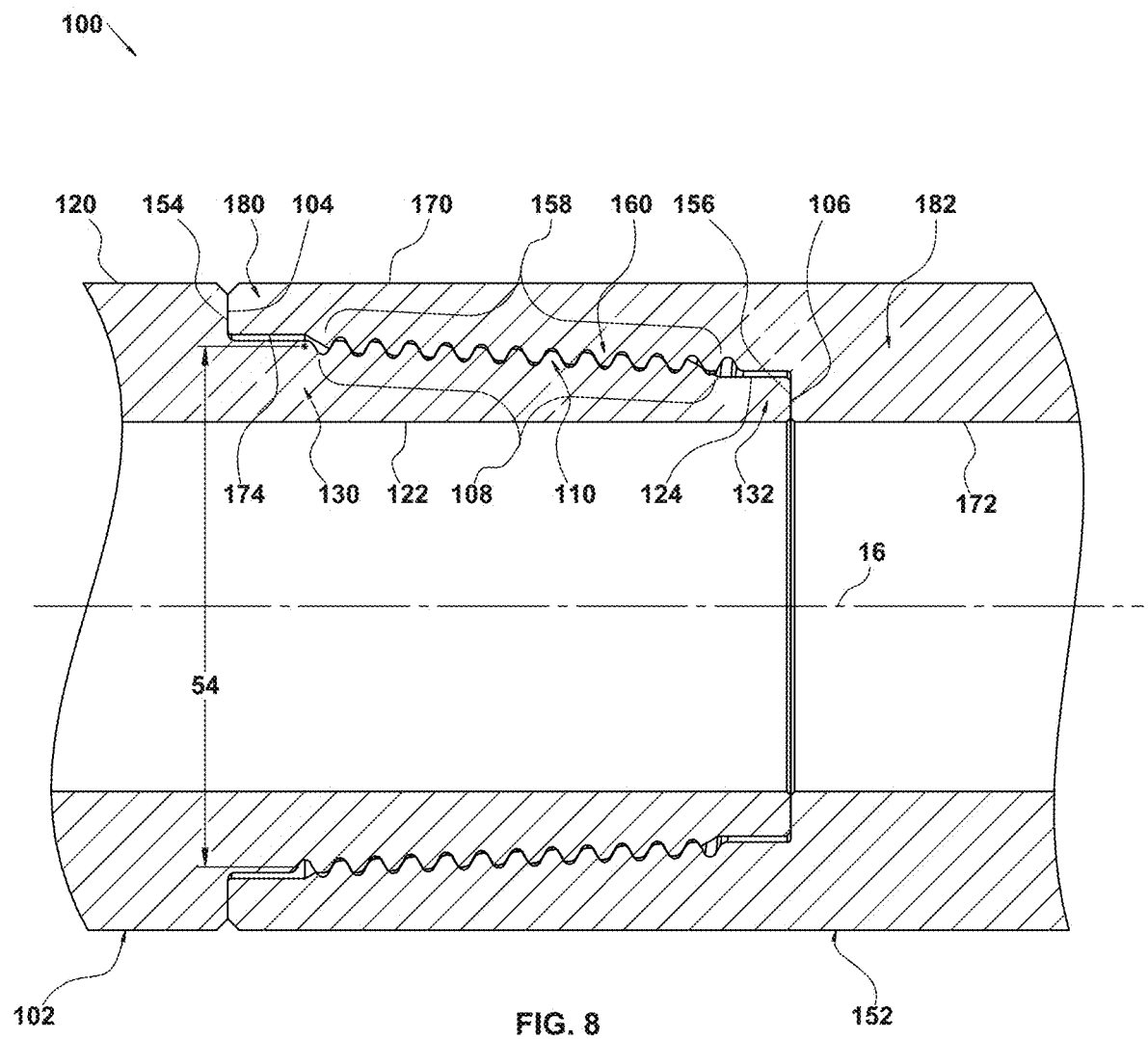
FIG. 8 is a side view section of a tubular connection having been threadably engaged.

Further referring then to FIG. 8, an embodiment of the tubular connection 100 is shown, the pin connector 102 shown in FIG. 5 and the box connector 152 shown in FIG. 6 having been threadably engaged. Without being limited to this theory or any other, it will be appreciated by those skilled in the art the cross sectional strength $S_{cs}$ of tubular connection 100 may by calculated by:

$$S_{cs} = Y_s \times (A_N + \text{lesser of } A_{PIN} \text{ or } A_{CB})$$

where:

$Y_s$ is the yield strength of the material, in pounds per square inch (psi) making up the tubular connection 100, $A_N$ is the pin nose cross sectional area 132 in square inches, $A_{PIN}$ is the pin cross sectional area 130 at the last engaged thread in square inches, $A_{CB}$ is the box counterbore cross sectional area 180 in square inches.

Referring to FIG. 9, FIG. 11, FIG. 13 to 15, and FIG. 17 to 18, enlarged views of various embodiments of fully formed pin threads 110 are shown. It should be appreciated that fully formed threads 160 on box connector 152 may be formed substantially the same as the pin connector threads 110 except that the box connector threads 160 would be formed in such a way that they would be flipped horizontally and vertically relative to the pin threads shown. As such the description of fully formed pin connector threads 110 fully describes equivalent fully formed box connector threads 160, thus a separate detailed description of fully formed box connector threads 160 is omitted herein for brevity.

Referring now to FIG. 9 and FIG. 10 enlarged views of fully formed pin threads 110' and fully formed box threads 160' are shown in a configuration that may be common to embodiments of prior art threads. Those skilled in the art will appreciate that each pin thread 110' features a crest 200, a root 202, a load flank 204, and a stabbing flank 206. When a connection 100' is threadably engaged, as shown in FIG. 10 each of the pin thread 110' load flanks 204 contacts the load flank of a corresponding box thread 160' along a projected radial direction such that a radial contact face $H_r'$ is formed by the mating load flanks, for example in this prior art $H_r'$ is equal to 0.082 inches.

Without being limited to this theory or any other, it will be appreciated by those skilled in the art the radial bearing strength of the $S_{rb}$ of a tubular connection 100 may by calculated by:

$$S_{rb} = \pi \cdot Y_S \cdot D \cdot L \cdot TPI \cdot H_r$$

where:
$Y_s$ is the yield strength of the material, in pounds per square inch (psi) making up the tubular connection 100,
D is the average diameter of the tubular connection 100 pin threads 110 and box threads 160 in inches,
L is the length of the zone of threads engaged between the pin connector 102 and box connector 152 in inches,
TPI is the thread density of the tubular connection 100 in Threads Per Inch,
$H_r$ is the total radial contact face in inches, where it will be appreciated by those skilled in the art that $H_r$ may be a single measured value of a single radial contact face or may be a summation of multiple radial contact faces without deviating from the concepts disclosed herein.

Figure 11:
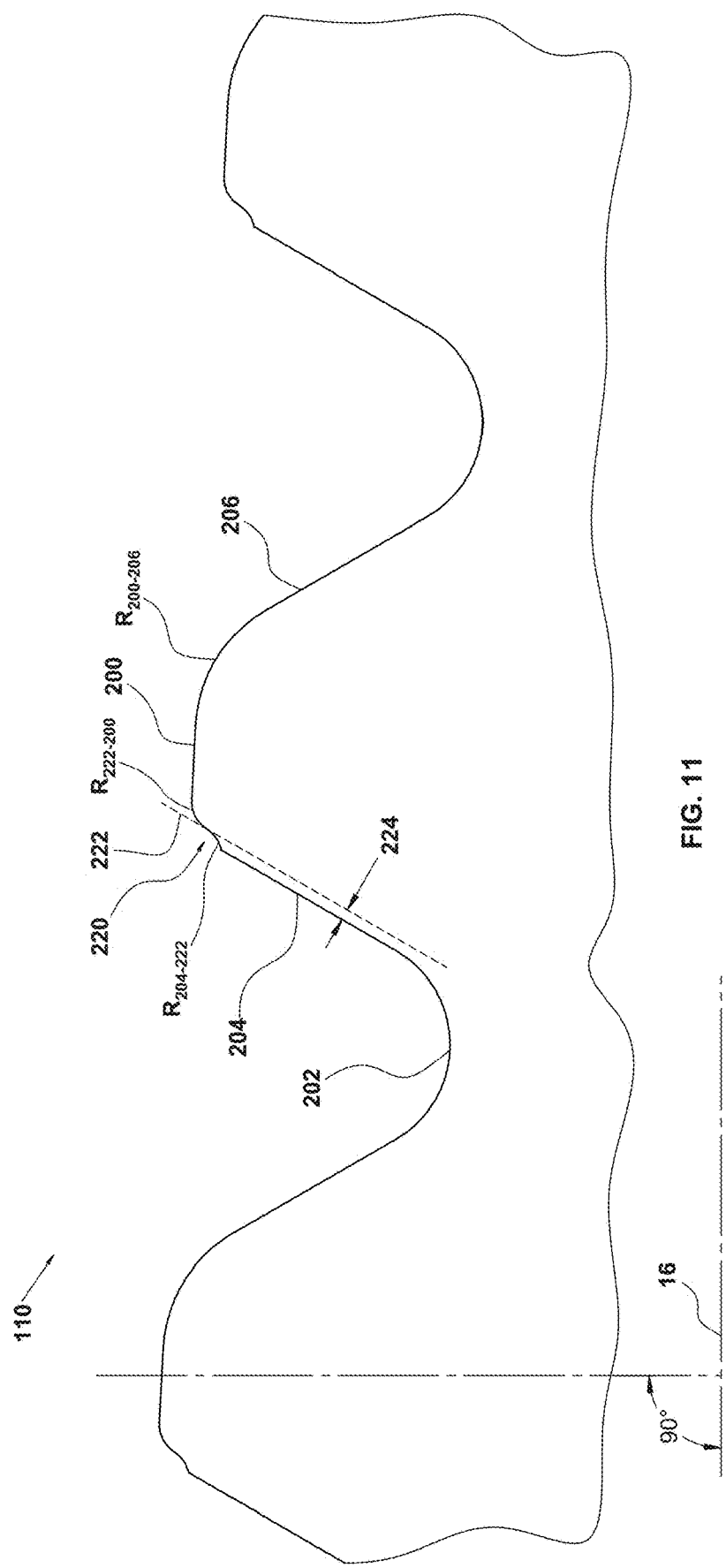
FIG. 11 is an enlarged cross section view of a portion of a pin connector having a preferred embodiment of a load flank reduction zone.

Referring now to FIG. 11, an enlarged view of fully formed pin threads 110 of tubular connection 100 is shown on a preferred embodiment of tubular member 10. Each thread 110 features a crest 200, a root 202, a load flank 204, and a stabbing flank 206. Further, each thread includes a load flank reduction zone 220 which acts to reduce the load flank contact area between the pin connector threads 110 and box connector threads 160 when the pin connector 102 is threadably engaged with a box connector 152. Similarly, while not specifically shown, as one skilled in the art would appreciate the load flank reduction zone 220 may instead be included on the box connector threads 160 as an alternative to the pin connector threads 110. In the preferred embodiment the load flank reduction zone 220 is included on the box connector threads 160 and on the pin connector threads 110. It will be understood that it is not a requirement of the present invention that the pin connector threads 110 are a perfect mirror of the box connector threads 160, only that at least one of the pin connector threads 110 or the box connector threads 160 feature a load reduction zone 220. In a more specific embodiment, the at least one load flank reduction zone 220 is configured such that the radial bearing strength $S_{rb}$ of the tubular connection 100 is between 100% to 110% of the cross sectional connection strength $S_{cs}$.

Referring still to the embodiment shown in FIG. 11 the load reduction zone 220 consists of a limiting flank 222 inset from the load flank 204 by an inset distance 224, a concave radius $R_{204-222}$ extending from the load flank 204 to the limiting flank 222, and a convex radius $R_{222-200}$ extending from the limiting flank 222 to the thread crest 200. Particularly, in the preferred embodiment the radii $R_{204-222}$ and $R_{222-200}$ are equal and the inset distance 224 of the limiting flank 222 is between approximately 0.002 and 0.010 inches. More particularly, the inset distance 224 is equal to 0.005 inches and the radii $R_{204-222}$ and $R_{222-200}$ are equal to 0.015 inches; however, it should be appreciated that values of the inset distance 224, and radii $R_{204-222}$ and $R_{222-200}$ may range greatly in other embodiments without deviating from the principles disclosed herein. Further details of the load reduction zone 220 and the resulting interaction of pin connector threads 110 with box connector threads 160 are presented below.

Figure 12:
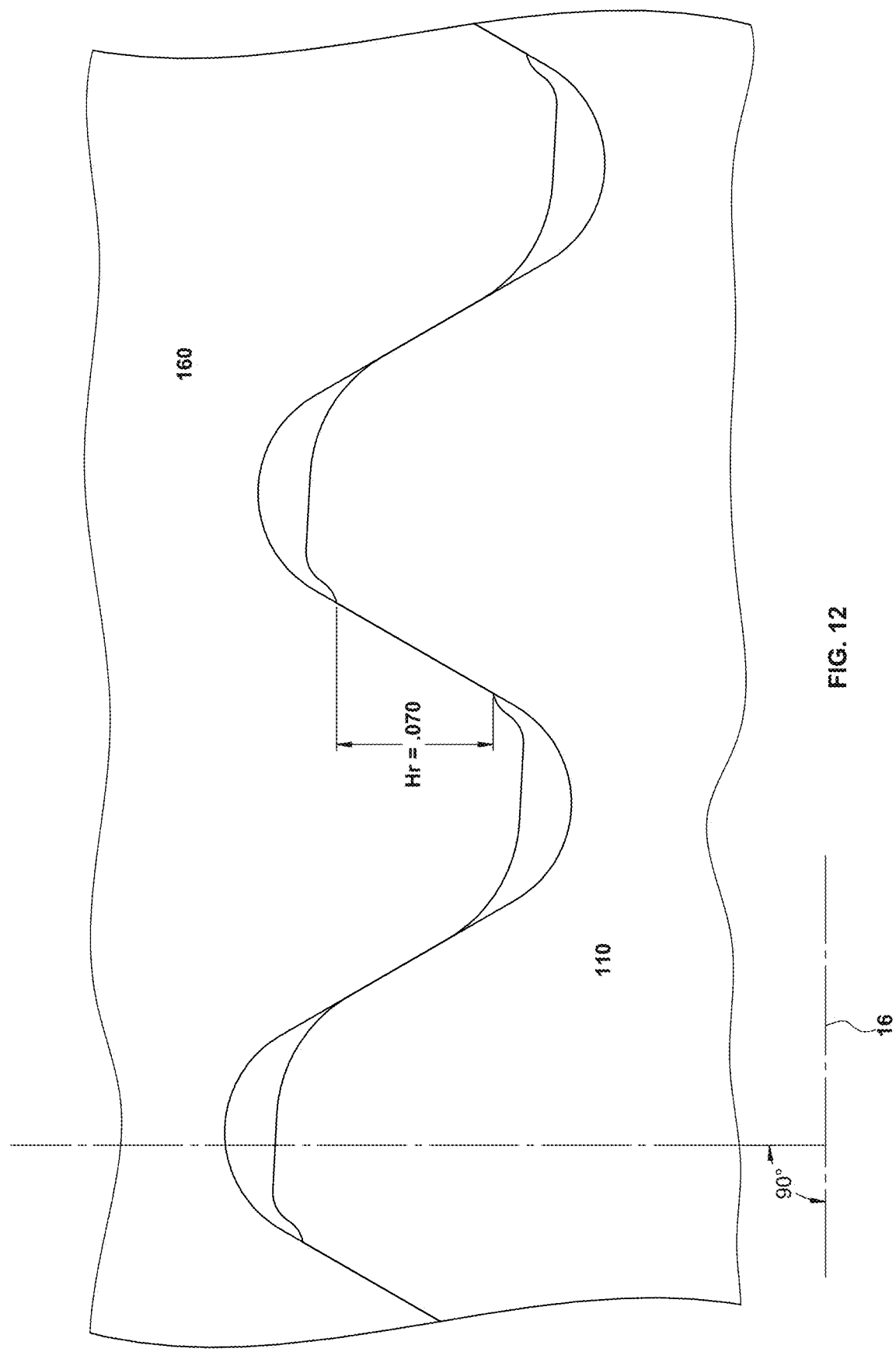
FIG. 12 is an enlarged cross section view of a portion of a tubular connection formed by pin connectors and box connectors both having a preferred embodiment of a load flank reduction zone.
Figure 17:
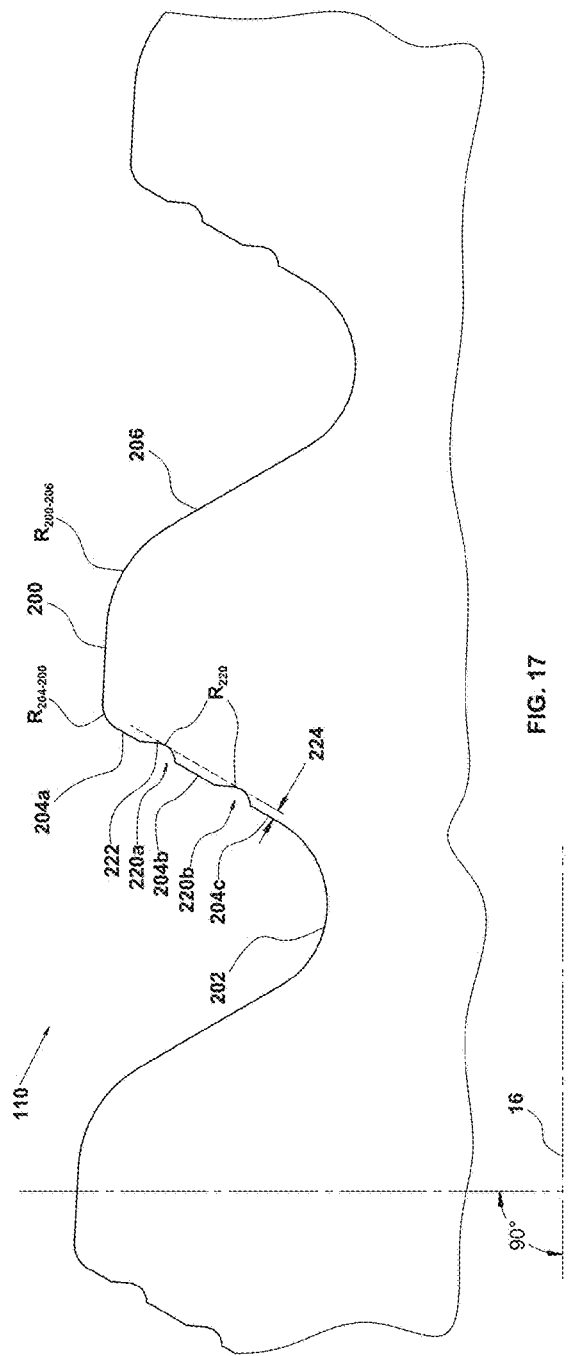
FIG. 17 is an enlarged cross section view of a portion of a pin connector having an alternative embodiment of two load flank reduction zone grooves.
Figure 18:
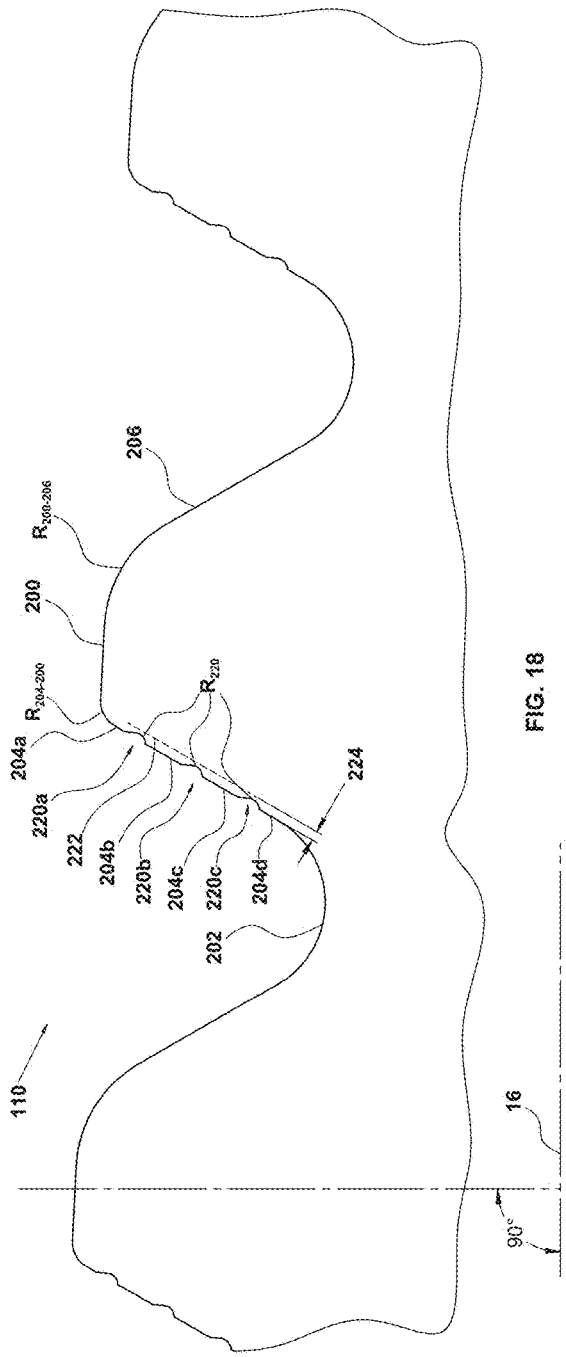
FIG. 18 is an enlarged cross section view of a portion of a pin connector having an alternative embodiment of a plurality of load flank reduction zone grooves.

Referring to FIG. 12 of the preferred embodiment, when a tubular connection 100 is threadably engaged as shown, each of the pin connector thread 110 load flanks 204 contacts the load flank of a corresponding box connector thread 160 along a projected radial direction such that a radial contact face $H_r$ is formed by the mating load flanks. More specifically in this preferred embodiment $H_r$ is equal to 0.070 inches.

Referring now to FIG. 13, a sequence of enlarged and exaggerated views of fully formed pin connector threads 110 of tubular connection 100 is shown having exaggerated illustrations of atomic spacing within. Without being limited to this theory or any other, when the tubular connection 100 is threadably engaged, the pin connector threads 110 experience load on the load flanks 204 as shown in FIG. 13b. Due to the presence of a preferred embodiment of the load reduction zone 220 the load flank 204 may experience strain hardening, illustrated here by the deformation and dislocation of atoms, whereby new interatomic bonds are formed. Upon removal of the load, it will be understood that a small amount of plastic deformation will have occurred to the load flank 204 due to the presence of the load flank reduction zone 220 and the increased interatomic bonding, however it will be appreciated that the macroscopic geometry and properties of the pin connector threads 110 (for example the shear strength) has not been appreciably altered and that the pin connector threads 110 remain compatible with mating box connector thread 160.

Referring now to FIG. 14 an enlarged view of fully formed pin connector threads 110 of tubular connection 100 is shown having an alternative embodiment of the load reduction zone 220. The load flank reduction zone 220 consists of a limiting flank 222 inset from the load flank 204 by an inset distance 224, a concave radius $R_{202-220}$ extending from the thread root 202 to the limiting flank 222, and a convex radius $R_{220-204}$ extending from the limiting flank 222 to the load flank 204. Particularly, in the preferred embodiment the radii $R_{202-220}$ and $R_{220-204}$ re equal to 0.030 and 0.015 inches respectively, and the inset distance 224 of the limiting flank 222 is between approximately 0.002 and 0.010 inches. More particularly, the inset distance 224 is equal to 0.005 inches; however, it should be appreciated that values of the inset distance 224, and radii $R_{204-222}$ and $R_{222-200}$ may range greatly in other embodiments without deviating from the principles disclosed herein.

Referring now to FIG. 15 an enlarged view of fully formed pin connector threads 110 of tubular connection 100 is shown having an alternative embodiment of the load reduction zone 220. The load flank reduction zone 220 consists of a limiting flank 222 inset from the load flank 204 by an inset distance 224 such that the load flank 204 is bifurcated into a first load flank 204a more proximate the thread crest 200, and a second load crest 204b more proximate the thread root 202. In this way, FIG. 16 demonstrates when a tubular connection 100 is threadably engaged, each of the pin connector thread 110 load flanks 204a and 204b contacts the at least one load flank of a corresponding box connector thread 160 along a projected radial direction such that at least two radial contact faces $H_{r1}$ and $H_{r2}$ are formed by the mating load flanks. It will be appreciated by those skilled in the art that the summation of $H_{r1}$ and $H_{r2}$ form a comparable total radial contact face $H_r$ to that disclosed in a preferred embodiment above. The load reduction zone 220 further consists of a convex radius $R_{220}$ extending from the second load flank 204b to the limiting flank 222 and connecting to the first load flank 204a. Particularly, in this embodiment the inset distance 224 of the limiting flank 220 is between approximately 0.002 and 0.010 inches. More particularly, the inset distance 224 is equal to 0.005 inches and the radius $R_{220}$ is equal to 0.010 inches; however, it should be appreciated that values of the inset distance 224, and radius $R_{220}$ may range greatly in other embodiments without deviating from the principles disclosed herein. It will be appreciated by those skilled in the art that it is undesirable to position the load reduction zone 220 in a location that would compromise the shear strength of the pin connector threads 110 or box connector threads 160.

Figure 19:
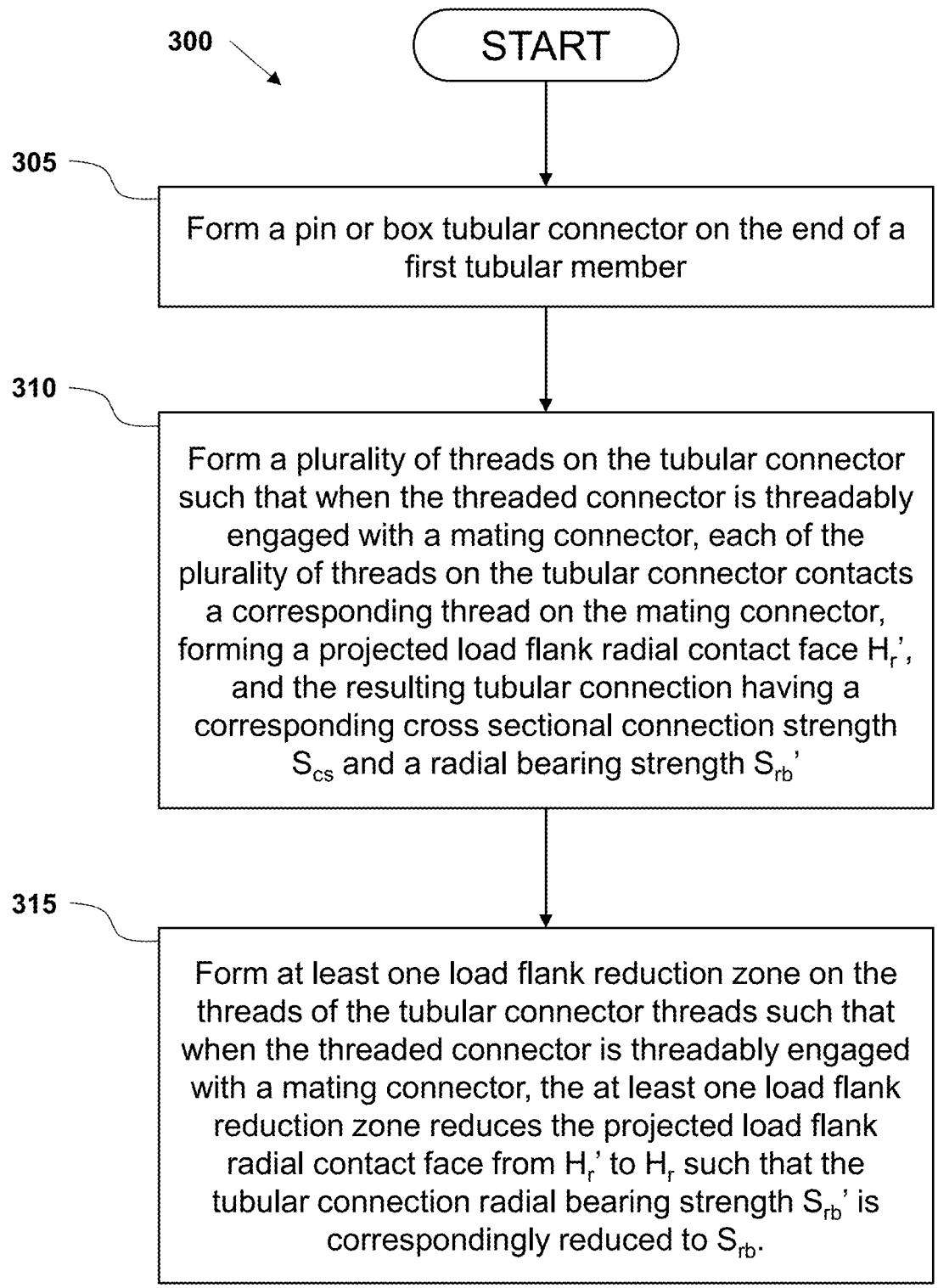
FIG. 19 is a block diagram for a method for manufacturing a tubular connector in accordance with the principles and embodiments discussed herein.

Referring now to FIG. 19 a method 300 for manufacturing a tubular connector is presented. Initially, the method 300 includes forming a pin connector (e.g., pin connector 102) or box connector (e.g., box connector 152) on one end of a first tubular member (e.g., a tubular member 10) in block 305. A plurality of threads (e.g. pin connector threads 110' or box connector threads 160') are formed on the threaded connector in block 310 such that when the tubular connection (e.g. tubular connection 100) is threadably engaged, each of the threads (e.g. pin connector threads 110' or box connector threads 160') of the tubular connector contacts the load flanks of the mating connector, and form a projected load flank radial contact face $H_r'$, and the tubular connection having a corresponding cross sectional connection strength $S_{cs}S$ and a radial bearing strength $S_{rb}'$. Finally in block 315, at least one load flank reduction zone (e.g. load flank reduction zone 220) is formed on the threads (e.g. pin connector threads 110' or box connector threads 160') in such a way that the projected load flank radial contact face $H_r'$ is reduced to $H_r$ and the threads are formed into fully formed threads (e.g. fully formed pin connector threads 110 or fully formed box connector threads 160) having a reduced radial bearing strength $S_{rb}$ along the length of the zone of threads. In a more specific embodiment, the at least one load flank reduction zone 220 is configured such that the radial bearing strength $S_{rb}$ of the tubular connection 100 is between 100% to 110% of the cross sectional connection strength $S_{cs}$.

It will be understood by persons skilled in the art that while some figures specifically illustrate at least one load reduction zone formed on pin connector threads 110 or box connector threads 160, this is for illustrative consistency and brevity, and that such load reduction zones 220 may be formed on the pin connector threads 110, box connector threads 160, or both the mating pin connector threads 110 and box connector threads 160 without deviating from the scope of the principles disclosed herein. It will be further understood by persons skilled in the art that any combination of load flank reduction zones 220 may occur (for example the further embodiments presented in FIG. 16 and FIG. 17, or combinations of the load flank reduction zones discussed herein) provided that when the tubular connection 100 is threadably made up the at least one load flank reduction zones 220 is configured such that the radial bearing strength $S_{rb}$ of the tubular connection 100 is reduced, and in a preferred embodiment is between 100% to 110% of the cross sectional connection strength $S_{cs}$.

Any use herein of terms describing an interaction between elements is not meant to limit the interaction to direct interaction between the subject elements and may also include indirect interaction between the elements such as through secondary or intermediary structure unless specifically stated otherwise. Further, unless expressly stated otherwise the steps in a method or method claim may be performed in any order. The use of identifiers a), b), c) and so forth before steps in describing a method should not be interpreted to specify a particular order to the steps, but instead are used for clarity and brevity in subsequent reference to such steps.

It will be apparent that changes may be made to the illustrative embodiments, while falling within the scope of the invention. As such, the scope of the following claims should not be limited by the preferred embodiments set forth in the examples and drawings described above but should be given the broadest interpretation consistent with the description as a whole.

What is claimed is:

1. A tubular member having a connector provided on an end thereof, wherein:
   a) the connector is a box connector, the box connector being adapted to receive a corresponding pin connector provided on another tubular member, the box connector comprising:
      i) a nominal pitch diameter, a longitudinal axis, a primary shoulder, a secondary shoulder, and a zone of internal threads;
      ii) the zone of internal threads comprising a plurality of threads which taper relative to the longitudinal axis, the plurality of threads comprising: a thread crest, a thread root, at least one load flank, a stabbing flank, and at least one load flank reduction zone;
      iii) the box connector being adapted to be threadably engaged with the corresponding pin connector provided on another tubular member, whereby a tubular connection is formed wherein each of the at least one load flanks of the box connector contacts a respective load flank of a corresponding thread on the corresponding pin connector along a projected radial direction such that at least one projected load flank radial contact face $H_r$ is formed by the mating load flanks;
      wherein the load flank reduction zone includes a limiting flank inset parallel to the load flank, a first radius extending between the thread crest and the limiting flank having a first radius of curvature, a second radius extending from the limiting flank to the load flank having a second radius of curvature; and
      wherein the first radius has a convex radius of curvature and the second radius has a concave radius of curvature; and/or,
   b) the connector is a pin connector, the pin connector being adapted to be received in a corresponding box connector provided on another tubular member, the pin connector comprising:
      i) a nominal pitch diameter, a longitudinal axis, a primary shoulder, a secondary shoulder, and a zone of external threads;
      ii) the zone of external threads comprising a plurality of threads which taper relative to the longitudinal axis, the plurality of threads comprising: a thread crest, a thread root, at least one load flank, a stabbing flank, and at least one load flank reduction zone;

iii) the pin connector being adapted to be threadably engaged with the corresponding box connector provided on another tubular member, whereby a tubular connection is formed wherein each of the at least one load flanks on the pin connector contacts a respective load flank of a corresponding thread on the corresponding box connector along a projected radial direction such that at least one projected load flank radial contact face $H_r$ is formed by the mating load flanks;

wherein the load flank reduction zone includes a limiting flank inset parallel to the load flank, a first radius extending between the thread crest and the limiting flank having a first radius of curvature, a second radius extending from the limiting flank to the load flank having a second radius of curvature; and wherein the first radius has a convex radius of curvature and the second radius has a concave radius of curvature.

2. The tubular member of claim 1, wherein, with respect to the box connector or the pin connector: the limiting flank is inset from the load flank between 0.002 and 0.010 inches and/or, the first convex radius of curvature is 0.015 inches and wherein the second concave radius of curvature is 0.015 inches.

3. The tubular member of claim 1, wherein, with respect to the box connector or the pin connector, when a connection between tubular members is made the tubular connection primary shoulder, secondary shoulder, average diameter, and plurality of threads correspond to a cross sectional connection strength $S_{es}$;

wherein the at least one projected load flank radial contact face $H_r$ corresponds to a radial bearing strength $S_{rb}$ along the entire length of the zone of threads; and wherein the at least one load flank reduction zone alters the projected load flank radial contact face such that the relationship $$1.00 \leq \frac{S_{rb}}{S_{cs}} \leq 1.10$$

is satisfied.

4. A method for manufacturing a connector on a tubular member, wherein:

A) the connector is a box connector, the box connector being adapted to receive a corresponding pin connector provided on another tubular member having an outer diameter, an inner throughbore diameter, and a longitudinal axis, the method comprising:
a) forming a box connector on an end of the first tubular member, the box connector comprising an outside diameter, an inner throughbore diameter, a box primary shoulder, a box secondary shoulder, and a zone of internal threads having a nominal pitch diameter;
wherein, when the box connector is threadably engaged with the corresponding pin connector, the primary shoulder, secondary shoulder, nominal pitch diameter, and plurality of threads form a cross sectional connection strength $S_{es}$;
b) forming a plurality of threads in the region between the box primary shoulder and the box secondary shoulder, the plurality of threads comprising a thread crest, thread root, a load flank, and a stabbing flank;
wherein, when the box connector is threadably engaged with the corresponding pin connector, each of the plurality of threads on the box connector contacts a corresponding thread on the corresponding pin connector along a projected radial direction such that a projected load flank radial contact face $H_r'$ is formed by the mating load flanks, corresponding to a radial bearing strength $S_{rb}'$ of the tubular connection;
c) forming at least one load flank reduction zone on the load flanks of the plurality of box connector threads, the load flank reduction zone comprising a limiting flank inset parallel to the load flank, a first radius extending between the thread crest and the limiting flank having a first convex radius of curvature, a second radius extending from the limiting flank to the load flank having a second concave radius of curvature;
wherein when the box connector is threadably engaged with the corresponding pin connector, the at least one load flank reduction zone reduces the projected load flank radial contact face $H_r'$ to $H_r$ such that the radial bearing strength of the tubular connection $S_{rb}'$ is reduced to $S_{rb}$; and/or, B) the connector is a pin connector, the pin connector being adapted to be received in a corresponding box connector provided on another tubular member having an outer diameter, an inner throughbore diameter, and a longitudinal axis, the method comprising:
a) forming a pin connector on the end of the first tubular member, the pin connector comprising an outside diameter, an inner throughbore diameter, a pin primary shoulder, a pin secondary shoulder, and a zone of external threads having a nominal pitch diameter;
wherein, when the pin connector is threadably engaged with the corresponding box connector, the primary shoulder, secondary shoulder, nominal pitch diameter, and plurality of threads form a cross sectional connection strength $S_{cs}$;
b) forming a plurality of threads in the region between the pin primary shoulder and the pin secondary shoulder, the plurality of threads comprising a thread crest, thread root, a load flank, and a stabbing flank;
wherein, when the pin connector is threadably engaged with the corresponding box connector, each of the plurality of threads on the pin connector contacts a corresponding thread on the corresponding box connector along a projected radial direction such that a projected load flank radial contact face $H_r'$ is formed by the mating load flanks, corresponding to a radial bearing strength $S_{rb}'$ of the tubular connection;
c) forming at least one load flank reduction zone on the load flanks of the plurality of pin connector threads, the load flank reduction zone comprising a limiting flank inset parallel to the load flank, a first radius extending between the thread crest and the limiting flank having a first convex radius of curvature, a second radius extending from the limiting flank to the load flank having a second concave radius of curvature;
wherein when the pin connector is threadably engaged with the corresponding box connector, the at least one load flank reduction zone reduces the projected load flank radial contact face $H_r'$ to $H_r$ such that the radial bearing strength of the tubular connection $S_{rb}'$ is reduced to $S_{rb}$.

5. The method of claim 4, wherein, with respect to the box connector or the pin connector: the limiting flank is inset from the load flank between 0.002 and 0.010 inches; and/or, the first convex radius of curvature is 0.015 inches and wherein the second concave radius of curvature is 0.015 inches.

6. The method of 4, wherein, with respect to the box connector or the pin connector, when the connector is threadably engaged with a corresponding connector, a tubular connection is formed whereby the at least one load flank reduction zone alters the tubular connection such that the relationship $$1.00 \le \frac{S_{rb}}{S_{cs}} \le 1.10$$

is satisfied.

7. A tubular member having a connector provided on an end thereof, wherein:
   A) the connector is a box connector, the box connector being adapted to receive a corresponding pin connector provided on another tubular member, the box connector comprising:
     i) a nominal pitch diameter, a longitudinal axis, a primary shoulder, a secondary shoulder, and a zone of internal threads;
     ii) the zone of internal threads comprising a plurality of threads which taper relative to the longitudinal axis, the plurality of threads comprising: a thread crest, a thread root, at least one load flank, a stabbing flank, and at least one load flank reduction zone;
     iii) the box connector being adapted to be threadably engaged with the corresponding pin connector provided on another tubular member, whereby a tubular connection is formed wherein each of the at least one load flanks on the box connector contacts a respective load flank of a corresponding thread on the corresponding pin connector along a projected radial direction such that at least one projected load flank radial contact face $H_r$ is formed by the mating load flanks;
   wherein when a connection between tubular members is made the tubular connection primary shoulder, secondary shoulder, average diameter, and plurality of threads correspond to a cross sectional connection strength $S_{cs}$; and
   wherein the at least one projected load flank radial contact face $H_r$ corresponds to a radial bearing strength $S_{rb}$ along the entire length of the zone of threads; and
   wherein the at least one load flank reduction zone alters the projected load flank radial contact face such that the relationship $$1.00 \le \frac{S_{rb}}{S_{cs}} \le 1.10$$

is satisfied; and/or,
   B) the connector is a pin connector, the pin connector being adapted to be received in a corresponding box connector provided on another tubular member, the pin connector comprising:
     i) a nominal pitch diameter, a longitudinal axis, a primary shoulder, a secondary shoulder, and a zone of external threads;
     ii) the zone of external threads comprising a plurality of threads which taper relative to the longitudinal axis, the plurality of threads comprising: a thread crest, a thread root, at least one load flank, a stabbing flank, and at least one load flank reduction zone;
     iii) the pin connector being adapted to be threadably engaged with the corresponding box connector provided on another tubular member, whereby a tubular connection is formed wherein each of the at least one load flanks on the pin connector contacts a respective load flank of a corresponding thread on the corresponding box connector along a projected radial direction such that at least one projected load flank radial contact face $H_r$ is formed by the mating load flanks;
   wherein when a connection between tubular members is made the tubular connection primary shoulder, secondary shoulder, average diameter, and plurality of threads correspond to a cross sectional connection strength $S_{cs}$;
   wherein the at least one projected load flank radial contact face $H_r$ corresponds to a radial bearing strength $S_rb$ along the entire length of the zone of threads;
   wherein the at least one load flank reduction zone alters the projected load flank radial contact face such that the relationship $$1.00 \le \frac{S_{rb}}{S_{cs}} \le 1.10$$

is satisfied.

8. The tubular member of claim 7, wherein, with respect to the box connector or the pin connector the load flank reduction zone includes:
   i) a limiting flank inset parallel to the load flank;
   ii) a first radius extending between the thread crest and the limiting flank having a first radius of curvature;
   iii) a second radius extending from the limiting flank to the load flank having a second radius of curvature;
   wherein the first radius has a convex radius of curvature and the second radius has a concave radius of curvature.

9. The tubular member of claim 8, wherein the limiting flank is inset from the load flank between 0.002 and 0.010 inches; and/or, the first convex radius of curvature is 0.015 inches and wherein the second concave radius of curvature is 0.015 inches.

10. The tubular member of claim 7, wherein, with respect to the box connector or the pin connector, the load flank reduction zone includes:
   i) a limiting flank inset parallel to the load flank;
   ii) a first radius extending between the thread root and the limiting flank having a first radius of curvature;
   iii) a second radius extending from the limiting flank to the load flank having a second radius of curvature;
   wherein the first radius has a concave radius of curvature and wherein the second radius has a concave radius of curvature.

11. The tubular member of claim 10, wherein: the limiting flank is inset from the load flank between 0.002 and 0.010 inches; and/or, the first concave radius of curvature is 0.030 inches and wherein the second concave radius of curvature is 0.015 inches.

12. The tubular member of claim 7, wherein, with respect to the box connector or the pin connector, the load flank reduction zone includes:
   i) at least one limiting flank inset parallel to the load flank;
   ii) a radius extending between the load flank and the limiting flank having a concave radius of curvature.

13. The tubular member of claim 12, wherein the limiting flank is inset from the load flank between 0.002 and 0.010 inches; and/or, the concave radius of curvature is 0.010 inches.

14. The tubular member of claim 7, wherein, with respect to the box connector or the pin connector, when a connection between tubular members is made the tubular connection projected load flank radial contact face $H_r$ is equal to approximately 0.070 inches.

15. The tubular member of claim 7, wherein upon being threadably engaged and torqued, the material directly adjacent the thread load flanks has a strain hardened metallurgical grain structure oriented parallel to the load flanks.

16. A tubular connection between a pin connector and a box connector, wherein the pin connector is adapted to be threadably engaged with the box connector, each of said connectors having an outer diameter, an inner throughbore diameter, a nominal pitch diameter, and a longitudinal axis, the connection comprising:
   i) a tapered pin connector comprising a pin primary shoulder, a pin secondary shoulder, and a zone of external threads, and a tapered box connector comprising a box primary shoulder, a box secondary shoulder, and a zone of internal threads;
   ii) the threaded zones comprising a plurality of threads which taper relative to the longitudinal axis, the plurality of threads comprising: a thread crest, a thread root, at least one load flank, a stabbing flank, and at least one load flank reduction zone;
   wherein each of the at least one load flanks on the pin connector contacts the at least one load flanks of the corresponding thread on the box connector along a projected radial direction such that at least one projected load flank radial contact face $H_r$ is formed by the mating load flanks,
   wherein the primary shoulder, secondary shoulder, average diameter, and plurality of threads correspond to a cross sectional connection strength $S_{cs}$;
   wherein the at least one projected load flank radial contact face corresponds to a radial bearing strength $S_{rb}$ along the entire length of the zone of threads;
   wherein the at least one load flank reduction zone alters the projected load flank radial contact face $H_r$ such that the relationship $$1.00 \leq \frac{S_{rb}}{S_{cs}} \leq 1.10$$

is satisfied.

17. A method for manufacturing a connector on a tubular member, wherein:
   A) the connector is a box connector, the box connector being adapted to receive a corresponding pin connector provided on another tubular member having an outer diameter, an inner throughbore diameter, and longitudinal axis, the method comprising:
      a) forming a box connector on the end of the first tubular member, the box connector comprising an outside diameter, an inner throughbore diameter, a box primary shoulder, a box secondary shoulder, and a zone of internal threads having a nominal pitch diameter;
      wherein, when the box connector is threadably engaged with the corresponding pin connector, the primary shoulder, secondary shoulder, nominal pitch diameter, and plurality of threads form a cross sectional connection strength $S_{cs}$;
      b) forming a plurality of threads in the region between the box primary shoulder and the box secondary shoulder, the plurality of threads comprising a thread crest, thread root, a load flank, and a stabbing flank;
      wherein, when the box connector is threadably engaged with the corresponding pin connector, each of the plurality of threads on the box connector contacts a corresponding thread on the corresponding pin connector along a projected radial direction such that a projected load flank radial contact face $H_r'$ is formed by the mating load flanks, corresponding to a radial bearing strength $S_{rb}'$ of the tubular connection;
      c) forming at least one load flank reduction zone on the load flanks of the plurality of box connector threads wherein when the box connector is threadably engaged with the corresponding pin connector, the at least one load flank reduction zone reduces the projected load flank radial contact face $H_r'$ to $H_r$ such that the radial bearing strength of the tubular connection $S_{rb}'$ is reduced to $S_{rb}$;
      wherein when the box connector is threadably engaged with the corresponding pin connector, a tubular connection is formed whereby the at least one load flank reduction zone alters the tubular connection such that the relationship $$1.00 \leq \frac{S_{rb}}{S_{cs}} \leq 1.10$$

is satisfied; and/or,
   B) the connector is a pin connector, the pin connector being adapted to be received in a corresponding box connector provided on another tubular member having an outer diameter, an inner throughbore diameter, and longitudinal axis, the method comprising:
      a) forming a pin connector on the end of the first tubular member, the pin connector comprising an outside diameter, an inner throughbore diameter, a pin primary shoulder, a pin secondary shoulder, and a zone of external threads having a nominal pitch diameter;
      wherein, when the pin connector is threadably engaged with the corresponding box connector, the primary shoulder, secondary shoulder, nominal pitch diameter, and plurality of threads form a cross sectional connection strength $S_{cs}$;
      b) forming a plurality of threads in the region between the pin primary shoulder and the pin secondary shoulder, the plurality of threads comprising a thread crest, thread root, a load flank, and a stabbing flank;
      wherein, when the pin connector is threadably engaged with the corresponding box connector, each of the plurality of threads on the pin connector contacts a corresponding thread on the corresponding box connector along a projected radial direction such that a projected load flank radial contact face $H_r'$ is formed by the mating load flanks, corresponding to a radial bearing strength $S_{rb}'$ of the tubular connection;
      c) forming at least one load flank reduction zone on the load flanks of the plurality of pin connector threads wherein when the pin connector is threadably engaged with the corresponding box connector, the at least one load flank reduction zone reduces the projected load flank radial contact face $H_r'$ to $H_r$ such that the radial bearing strength of the tubular connection $S_{rb}'$ is reduced to $S_{rb}$;
      wherein when the pin connector is threadably engaged with the corresponding box connector, a tubular connection is formed whereby the at least one load flank reduction zone alters the tubular connection such that the relationship $$1.00 \leq \frac{S_{rb}}{S_{cs}} \leq 1.10$$

is satisfied.

18. The method of claim 17, wherein, with respect to the box connector or the pin connector, the load flank reduction zone of (c) further comprises:
forming a limiting flank inset parallel to the load flank, a first radius extending between the thread crest and the limiting flank having a first radius of curvature, a second radius extending from the limiting flank to the load flank having a second radius of curvature;
wherein the first radius has a first convex radius of curvature and the second radius has a second concave radius of curvature.

19. The method of claim 18, wherein: the limiting flank is inset from the load flank between 0.002 and 0.010 inches; and/or, the first convex radius of curvature is 0.015 inches and wherein the second concave radius of curvature is 0.015 inches.

20. The method of claim 17, wherein, with respect to the box connector or the pin connector, the load flank reduction zone of (c) further comprises:
forming a limiting flank inset parallel to the load flank, a first radius extending between the thread root and the limiting flank having a first radius of curvature, a second radius extending from the limiting flank to the load flank having a second radius of curvature;
wherein the first radius has a first concave radius of curvature and wherein the second radius has a concave radius of curvature.

21. The method of claim 20, wherein: the limiting flank is inset from the load flank between 0.002 and 0.010 inches; and/or, the first concave radius of curvature is 0.030 inches and wherein the second concave radius of curvature is 0.015 inches.

22. The method of claim 17, wherein, with respect to the box connector or the pin connector, the load flank reduction zone of (c) further comprises forming a limiting flank inset parallel to the load flank, and a radius extending between the load flank and the limiting flank having a concave radius of curvature.

23. The method of claim 22, wherein: the limiting flank is inset from the load flank between 0.002 and 0.010 inches; and/or, the concave radius of curvature is 0.010 inches.

24. The method of claim 17, wherein, with respect to the box connector or the pin connector, (c) further comprises forming the load reduction zone wherein the projected load flank radial contact face $H_r$ is equal to approximately 0.070 inches.

* * * * *